(12) United States Patent
Morisawa

(10) Patent No.: US 11,200,690 B2
(45) Date of Patent: Dec. 14, 2021

(54) IMAGE PROCESSING APPARATUS, THREE-DIMENSIONAL SHAPE DATA GENERATION METHOD, AND NON-TRANSITORY COMPUTER READABLE STORAGE MEDIUM

(71) Applicant: CANON KABUSHIKI KAISHA, Tokyo (JP)

(72) Inventor: Keisuke Morisawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/680,849

(22) Filed: Nov. 12, 2019

(65) Prior Publication Data

US 2020/0175702 A1 Jun. 4, 2020

(30) Foreign Application Priority Data

Dec. 3, 2018 (JP) .............................. JP2018-226607

(51) Int. Cl.
*G06T 7/55* (2017.01)
*H04N 13/25* (2018.01)
*G06T 17/00* (2006.01)

(52) U.S. Cl.
CPC ................ *G06T 7/55* (2017.01); *G06T 17/00* (2013.01); *H04N 13/25* (2018.05); *G06T 2207/10021* (2013.01)

(58) Field of Classification Search
CPC . G06T 7/55; G06T 17/00; G06T 2207/10021; H04N 13/25; H04N 13/117; H04N 13/243

USPC .......................................................... 348/46
See application file for complete search history.

(56) References Cited

U.S. PATENT DOCUMENTS

| | | | |
|---|---|---|---|
| 6,556,704 B1 * | 4/2003 | Chen | G06K 9/20 382/154 |
| 7,564,476 B1 * | 7/2009 | Coughlan | H04N 7/147 348/14.01 |
| 10,217,195 B1 * | 2/2019 | Agrawal | G06T 7/11 |
| 10,609,307 B2 * | 3/2020 | Adsumilli | H04N 13/128 |
| 2008/0077953 A1 * | 3/2008 | Fernandez | H04N 7/15 725/32 |

(Continued)

OTHER PUBLICATIONS

Laurentini "The Visual Hull Concept for Silhouette-Based Image Understanding." IEEE Transactions on Pattern Analysis and Machine Intelligence. 1994. vol. 16, No. 2, pp. 150-162. Cited in the specification.

*Primary Examiner* — Tung T Vo
(74) *Attorney, Agent, or Firm* — Rossi, Kimms & McDowell LLP

(57) ABSTRACT

A generation apparatus acquires a plurality of images obtained based on image capturing by a plurality of image capturing devices, the image indicating an object area of an object and being used for generating three-dimensional shape data of the object. The generation apparatus detects an abnormal image from among the acquired plurality of images. The generation apparatus performs processing on the detected abnormal image, in a case where the abnormal image is detected. The generation apparatus generates three-dimensional shape data of the object, by use of an image obtained as a result of performing the processing on the detected abnormal image, instead of the detected abnormal image, in a case where the abnormal image is detected.

18 Claims, 23 Drawing Sheets

(56) References Cited

U.S. PATENT DOCUMENTS

| | | | | |
|---|---|---|---|---|
| 2008/0181453 | A1* | 7/2008 | Xu | G06T 7/277 382/103 |
| 2010/0322515 | A1* | 12/2010 | Cheng | G06T 5/30 382/173 |
| 2011/0249090 | A1* | 10/2011 | Moore | G06T 19/006 348/43 |
| 2012/0169722 | A1* | 7/2012 | Hwang | H04N 13/111 345/419 |
| 2013/0100252 | A1* | 4/2013 | Ikeda | G06T 7/11 348/46 |
| 2013/0106848 | A1* | 5/2013 | Nguyen | G06T 15/205 345/419 |
| 2013/0127844 | A1* | 5/2013 | Koeppel | G06T 15/04 345/419 |
| 2014/0293028 | A1* | 10/2014 | Nguyen | H04N 13/305 348/59 |
| 2016/0093101 | A1* | 3/2016 | Benedek | G06T 7/11 345/420 |
| 2017/0094192 | A1* | 3/2017 | Adsumilli | G06T 7/143 |
| 2017/0148199 | A1* | 5/2017 | Holzer | G06T 3/4038 |
| 2017/0372449 | A1* | 12/2017 | Yarvis | G06T 7/12 |
| 2018/0020188 | A1* | 1/2018 | Eldar | G06T 7/194 |
| 2018/0191941 | A1* | 7/2018 | Arai | G06T 7/194 |
| 2018/0204381 | A1* | 7/2018 | Kanatsu | G06T 19/003 |
| 2018/0262737 | A1* | 9/2018 | Monnier | H04N 13/15 |
| 2018/0330163 | A1* | 11/2018 | Matsuzaki | G06K 9/00624 |
| 2019/0004597 | A1* | 1/2019 | Gai | H04N 13/344 |
| 2019/0043003 | A1* | 2/2019 | Fisher | G01S 3/00 |
| 2020/0051323 | A1* | 2/2020 | Araki | G06T 15/205 |
| 2020/0202611 | A1* | 6/2020 | Wang | H04N 13/246 |
| 2020/0258299 | A1* | 8/2020 | Kobayashi | G06T 15/20 |

* cited by examiner

IMAGE PROCESSING APPARATUS, THREE-DIMENSIONAL SHAPE DATA GENERATION METHOD, AND NON-TRANSITORY COMPUTER READABLE STORAGE MEDIUM

BACKGROUND

Technical Field

The present disclosure relates to generation of three-dimensional shape data of a foreground from captured images of multiple viewpoints.

Description of the Related Art

There is a technology to generate a virtual viewpoint image that reproduces an image from a virtual camera, which is not actually present, by use of images of multiple viewpoints obtained based on the synchronous image capturing by multiple cameras installed at different positions. For generation of a virtual viewpoint image, images of a foreground captured by multiple cameras are collected into an image processing unit such as a server, so as to generate three-dimensional shape data of the foreground by the image processing unit.

In Laurentini A: "The Visual Hull Concept for Silhouette-Based Image Understanding", IEEE Transcriptions Pattern Analysis and machine Intelligence, Vol. 16, No. 2, pp. 150-162, February 1994, there is described a method for generating three-dimensional shape data of a foreground by a volume intersection method. In the volume intersection method, an image representing a two-dimensional silhouette of a foreground on the image sensing surface is generated from the image sensing surface obtained by image capturing of the target object that is to be the foreground. Furthermore, in the volume intersection method, a view volume, which is a cone extending in the three-dimensional space so as to pass through each point on the outline of a two-dimensional silhouette of a foreground from the center of projection of a camera, is to be considered. The volume intersection method is a method for generating three-dimensional shape data of a foreground by obtaining the same area of respective view volumes by multiple cameras.

Due to failure, or the like, of some cameras among multiple cameras for generating three-dimensional shape data of a foreground, there is a case in which images representing two-dimensional silhouettes of a foreground based on image capturing by the cameras become inappropriate. In that case, if three-dimensional shape data is generated by the volume intersection method, three-dimensional shape data of the foreground is generated by obtaining the same area of view volumes based on the inappropriate images and view volumes based on normal images. For this reason, there is a possibility that the three-dimensional shape data of the foreground cannot be generated with high accuracy.

SUMMARY OF THE DISCLOSURE

An image processing apparatus according to an embodiment of the present disclosure includes: an acquisition unit configured to acquire a plurality of images obtained based on image capturing by a plurality of image capturing devices, the image indicating an object area of an object and being used for generating three-dimensional shape data of the object; a detection unit configured to detect an abnormal image from among the acquired plurality of images; a processing unit configured to perform processing on the detected abnormal image in a case where the abnormal image is detected; and a generation unit configured to generate the three-dimensional shape data of the object by use of an image obtained as a result of performing the processing on the detected abnormal image, instead of the detected abnormal image, in a case where the abnormal image is detected.

Further features of the present disclosure will become apparent from the following description of exemplary embodiments with reference to the attached drawings.

DESCRIPTION OF THE EMBODIMENTS

Hereinafter, with reference to the accompanying drawings, a detail explanation is given based on preferred embodiments of the technology of the present disclosure. Note that the configurations illustrated in the following embodiments are merely examples and the present disclosure is not limited to the illustrated configurations.

First Embodiment

In the present embodiment, an explanation is given of a mode of generating three-dimensional shape data (data indicating a three-dimensional model) of a foreground, which is used for generating a virtual viewpoint image. Prior to the explanation of the present embodiment, generation of a three-dimensional model by the volume intersection method (shape from silhouette method) is explained.

Figure 1A:
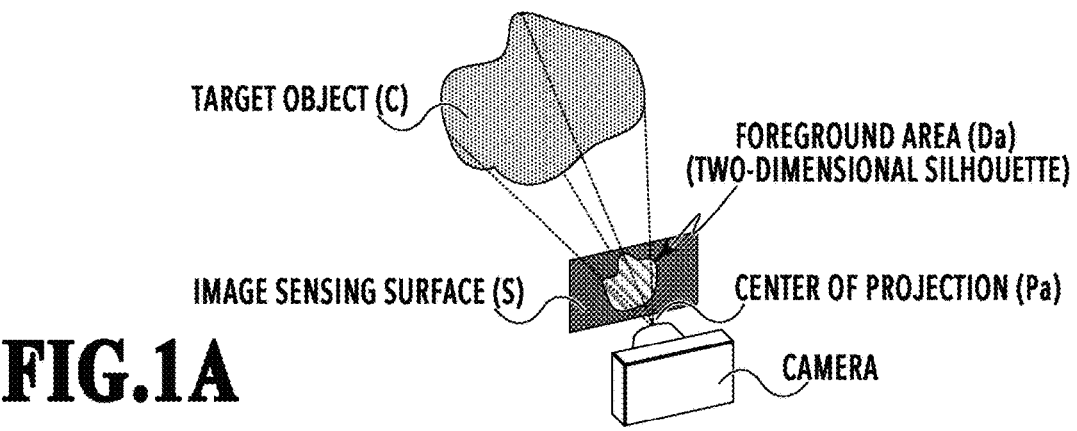
FIGS. 1A through 1C are figures illustrating a generation method of a three-dimensional model by the volume intersection method.
Figure 1B:
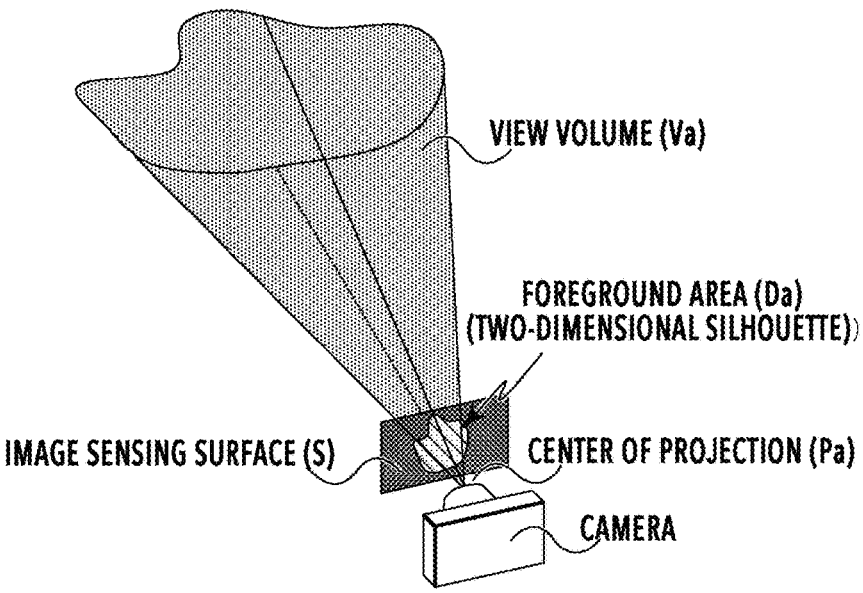
Figure 1C:
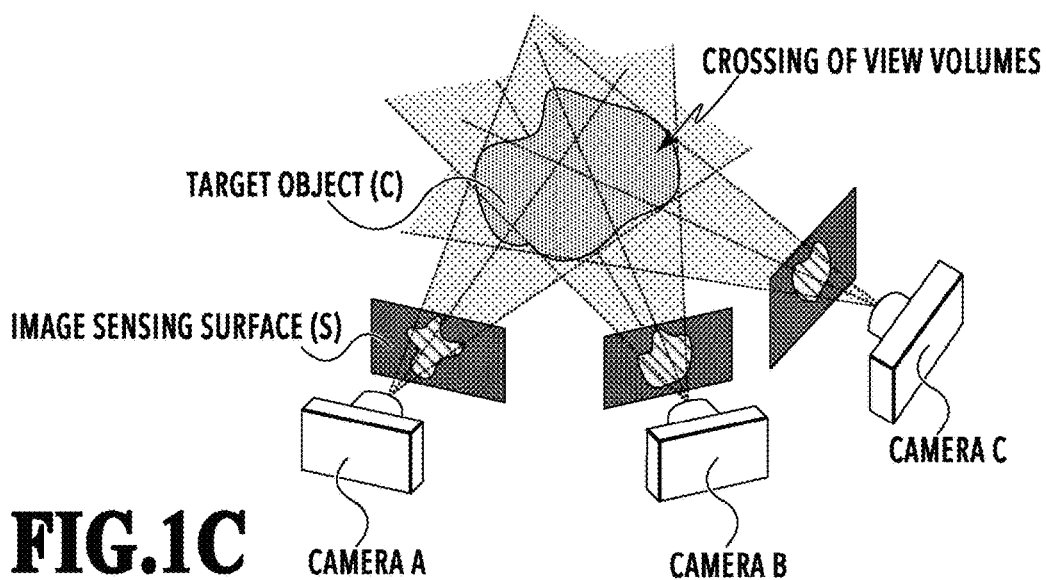

FIGS. 1A through 1C are figures illustrating the basic principle of the volume intersection method. FIG. 1A is a figure in a case where an image of a certain target object C is captured by a camera, which is an image capturing device. A two-dimensional silhouette Da of a foreground, which indicates the object on the image sensing surface S of the image captured by the camera in FIG. 1A, is obtained. FIG. 1B is a figure illustrating a cone extending in the three-dimensional space so as to pass through each point on the outline of the foreground area Da from the center of projection Pa of the camera. This cone is referred to as a view volume Va by the camera.

FIG. 1C is a figure illustrating how a three-dimension of an object (a three-dimensional model of a foreground) is obtained from the multiple view volumes. As illustrated in FIG. 1C, multiple view volumes of respective cameras are obtained from foreground areas (object areas) based on images synchronously captured by multiple different cameras at different positions. The volume intersection method is a method for obtaining a three-dimensional model of a foreground of an object by obtaining the crossing (same area) of view volumes of such multiple cameras.

Here, an object to be a "foreground" of an image is a target object that can be viewed from a given angle of a virtual viewpoint. In the present embodiment, an object refers to a human figure that is present on the field of a stadium. Alternatively, an object that can be a foreground may be an object having a predetermined image pattern, such as a ball or a goal. Furthermore, an object may be a moving object or a stationary object. "Background" refers to an area other than foregrounds of an image.

A virtual viewpoint image generated by use of a three-dimensional model of a foreground is an image generated based on the position and orientation, etc., of a virtual camera, which is different from real cameras, and is also referred to as a free-viewpoint image or an arbitrary viewpoint image. For example, according to a technology for generating a virtual viewpoint image, highlight scenes of a soccer or basketball game can be viewed from various angles, so that it is possible to give a user a highly realistic feeling, compared to normal images. A number of virtual viewpoint image generation systems based on a volume intersection method have been developed, and it is desired that a three-dimensional model of a foreground is appropriately generated in such systems.

Figure 2:
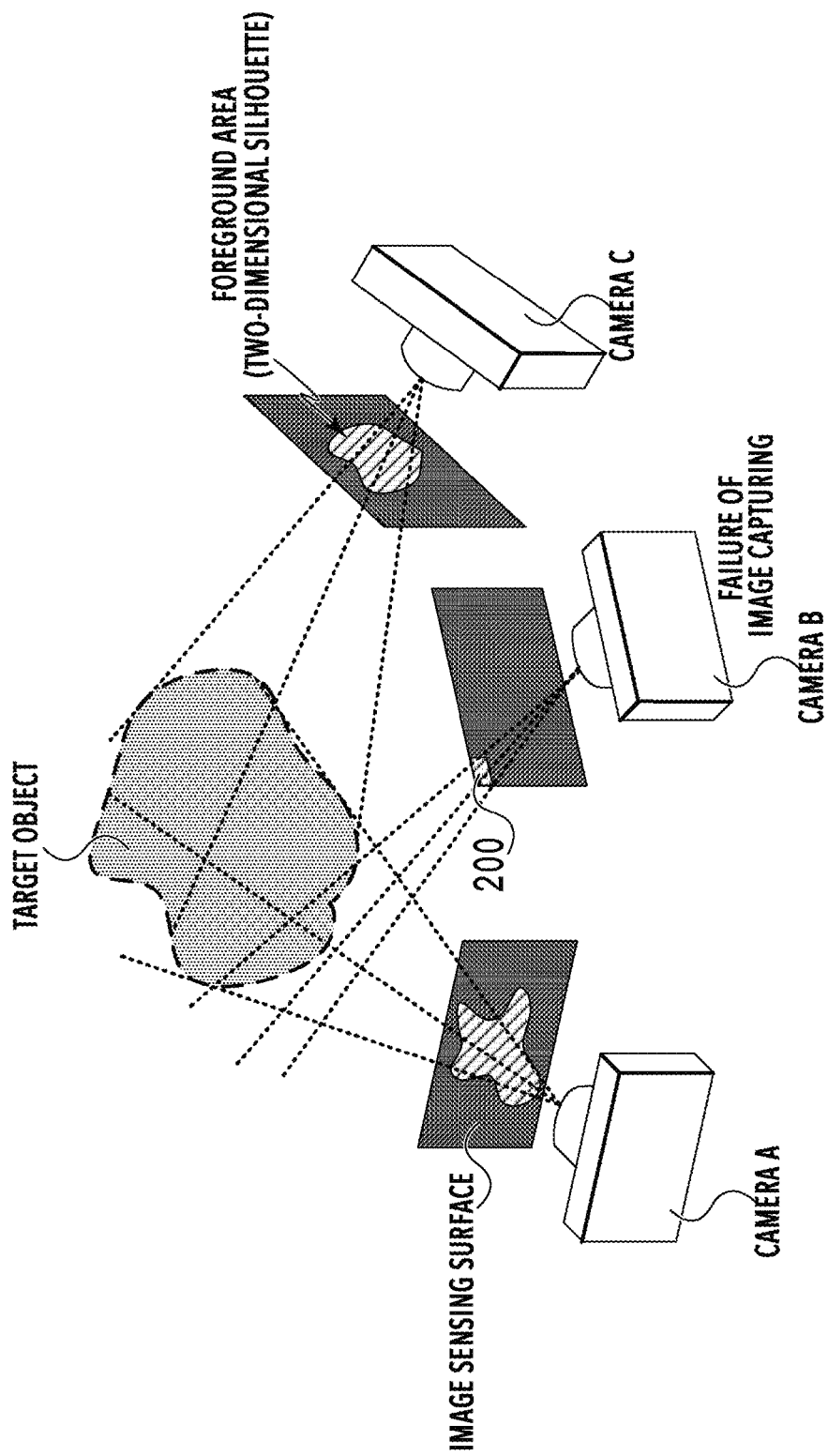
FIG. 2 is a figure illustrating the generation method of a three-dimensional model based on an improper foreground mask image.

FIG. 2 is a figure in a case where an image of a target object to be a foreground is captured by each of the cameras A through C in order to generate a three-dimensional model of a foreground by the volume intersection method. Here, the image capturing by the camera B fails due to failure of the camera, or the like, and the foreground area 200 obtained from the image sensing surface by the camera B is an image including almost no area indicating a foreground. In addition to such failure of a camera, there may be a case in which a foreground area does not correctly represent the silhouette of an object due to abnormality in a transmission system connecting a camera and an image processing apparatus that acquires image data or an inappropriate setting of an imaging parameter, etc. Such an abnormal state is referred to as an "improper" state. In the example of FIG. 2, the view volume of the camera B and the view volumes of the normal cameras A and C other than the camera B do not have the same area, and, therefore, the three-dimensional model of a foreground is not appropriately generated.

Thus, as described later, the present embodiment is a mode in which, in a case where an image indicating a foreground area (foreground mask image) is improper, processing for inhibiting the negative influence of the improper foreground mask image on generation of a three-dimensional model of a foreground is performed.

[System Configuration]

Figure 3A:
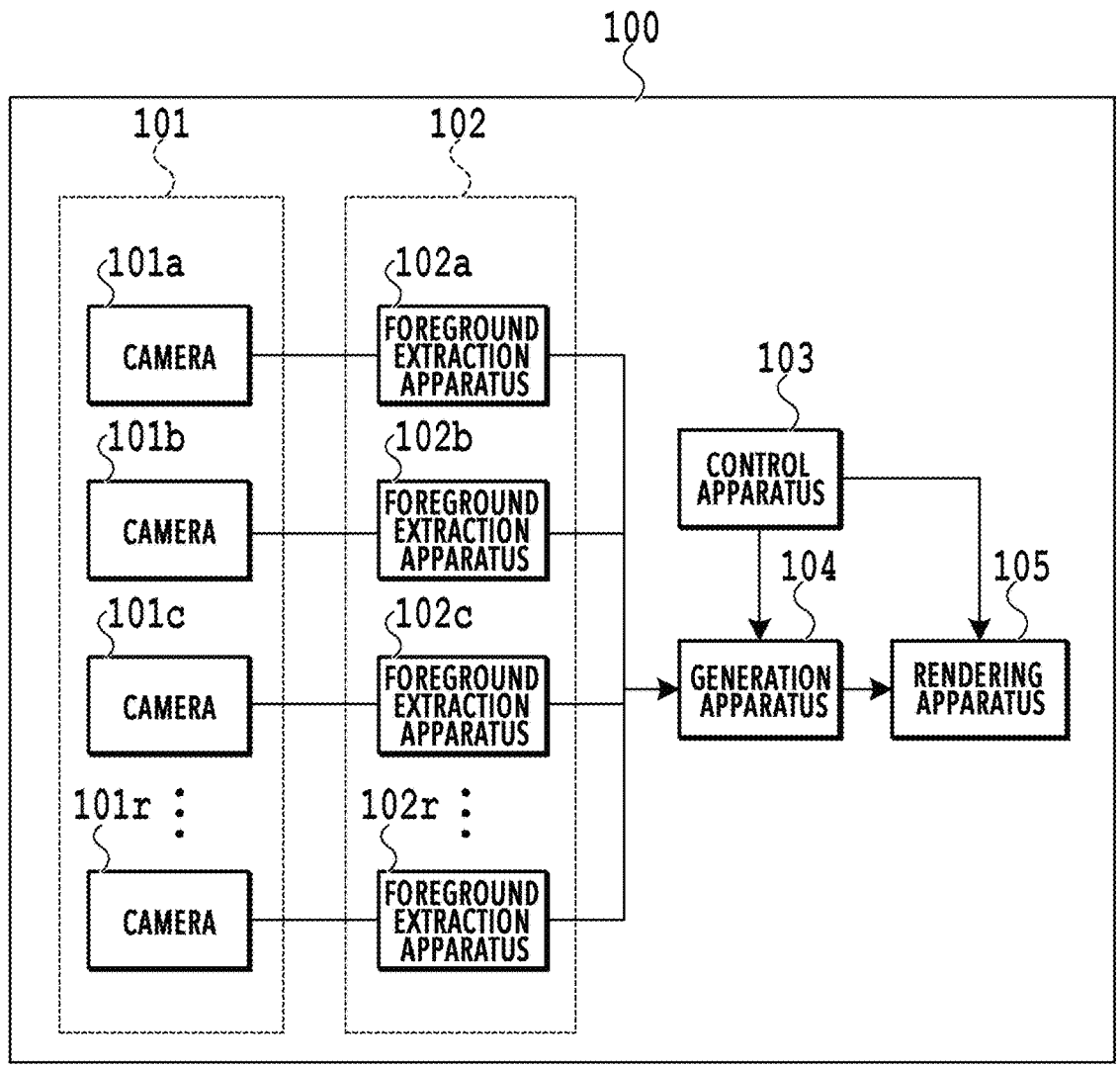
FIG. 3A is a figure illustrating a configuration of a virtual viewpoint image generation system.

FIG. 3A is a block figure illustrating an example of a configuration of the virtual viewpoint image generation system according to the present embodiment. The virtual viewpoint image generation system 100 includes a camera array 101 configured with multiple cameras 101a through 101r, a foreground extraction apparatus group 102 configured with multiple foreground extraction apparatuses 102a through 102r, a control apparatus 103, a generation apparatus 104, and a rendering apparatus 105. The foreground extraction apparatuses 102a through 102r, the control apparatus 103, the generation apparatus 104, and the rendering apparatus 105 are realized by a general image processing apparatus including a CPU that performs arithmetic processing, a memory that stores a result of arithmetic processing and a program, etc.

Here, a hardware configuration of the generation apparatus 104 is explained with reference to FIG. 3B. The generation apparatus 104 includes a CPU 351, a ROM 352, a RAM 353, a complement storage device 354, a display unit 355, an operation unit 356, a communication I/F 357, and a bus 358.

The CPU 351 controls the entire generation apparatus 104 by use of a computer program and data stored in the ROM 352, the RAM 353, or the like, so as to realize each of the later-described functions of the generation apparatus 104 illustrated in FIG. 8. The ROM 352 stores a program that need not be changed, etc. The RAM 353 temporarily stores data or a program supplied from the complement storage device 354, data supplied from the outside via the communication I/F 357, or the like. The complement storage device 354 is configured with, for example, a hard disk drive (HDD), etc., and stores various kinds of data such as image data and audio data.

The display unit 355 is configured with, for example, a liquid crystal display, an LED, or the like, and displays a GUI (Graphical User Interface), etc., for a user to operate the generation apparatus 104. The operation unit 356 is configured with, for example, a keyboard, a mouse, a joystick, a touch-sensitive panel, or the like, and inputs various kinds of instructions to the CPU 351 in response to operations by a user.

The communication I/F 357 is used for communication with an external apparatus of the generation apparatus 104. For example, in a case where the generation apparatus 104 is connected to an external apparatus by wire, a cable for communication is connected to the communication I/F 357. In a case where the generation apparatus 104 has a function of performing wireless communication with an external apparatus, the communication I/F 357 includes an antenna. The bus 358 connects each unit of the generation apparatus 104 and transmits information.

In the present embodiment, it is assumed that the display unit 355 and the operation unit 356 are present inside an apparatus. However, at least one of the display unit 355 and the operation unit 356 may be present as a separate device outside the apparatus. In this case, the CPU 351 may operate as a display control unit that controls the display unit 355 and as an operation control unit that controls the operation unit 356.

Figure 3B:
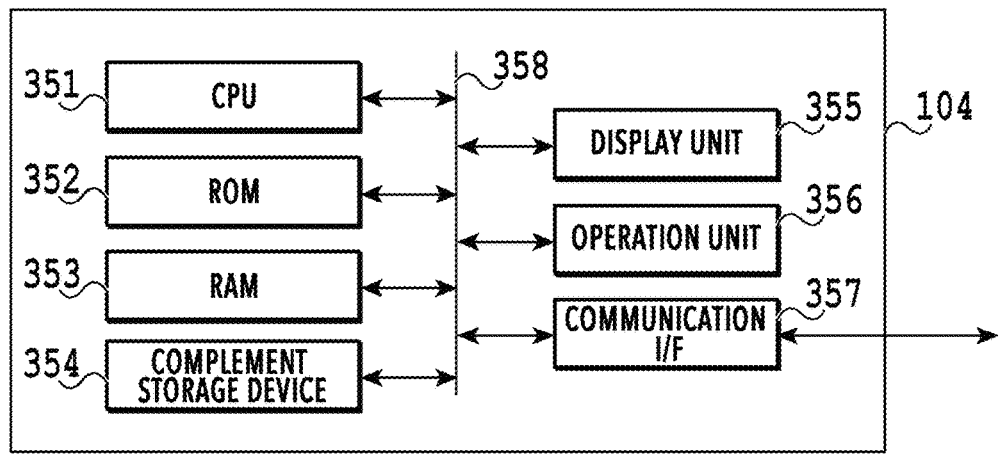
FIG. 3B is a figure illustrating a hardware configuration of a generation apparatus.

The foreground extraction apparatuses 102a through 102r, the control apparatus 103, and the rendering apparatus 105 also have the same kind of hardware configuration as in FIG. 3B. The foreground extraction apparatuses 102a through 102r, the control apparatus 103, the generation apparatus 104, and the rendering apparatus 105 may have one or more dedicated hardware other than the CPU or a GPU (Graphics Processing Unit). Further, at least a part of the processing by the CPU may be performed by the GPU or the dedicated hardware. Examples of dedicated hardware include an ASIC (Application Specific Integrated Circuit), a DSP (Digital Signal Processor), and the like.

Figure 4:
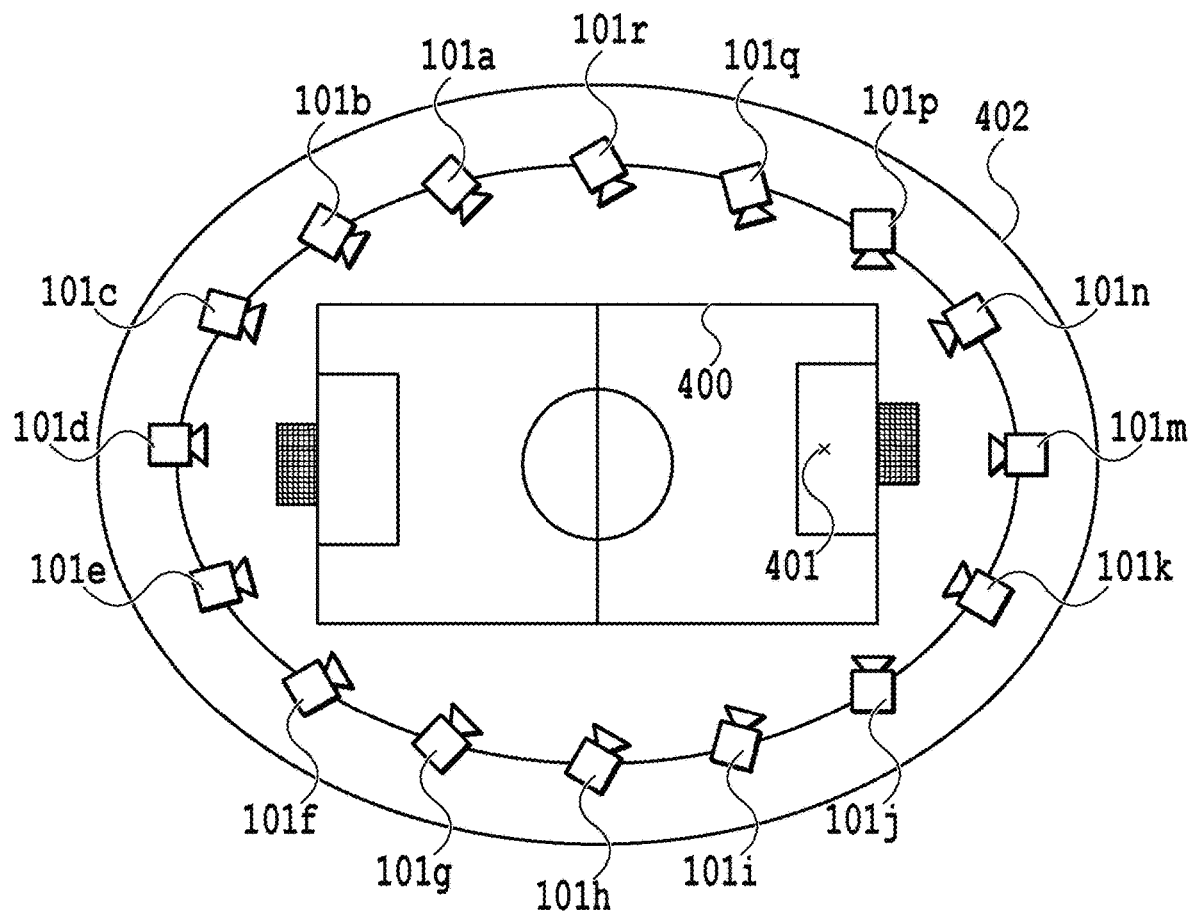
FIG. 4 is a figure illustrating an example of camera arrangement in the virtual viewpoint image generation system.

The camera array 101 is configured with multiple cameras 101a through 101r. The camera array 101 captures images of an object to be a foreground from multiple directions at various angles and outputs image data of the captured images to the foreground extraction apparatus group 102. FIG. 4 is a figure illustrating arrangements of all 16 cameras 101a through 101r configuring the camera array 101 in a plane view of the field 400 viewed from vertically above. As illustrated in FIG. 4, the cameras are arranged around the stadium 402, and images are captured synchronically in terms of time from various angles toward the same gazing point 401 on the field by all of the cameras 101a through 101r.

The foreground extraction apparatus group 102 includes foreground extraction apparatuses 102a through 102r corresponding to the respective cameras 101a through 101r. Each of the foreground extraction apparatuses 102a through 102r extracts a foreground area (object area) indicating a foreground included in a captured image from the image data of the captured image output from the corresponding camera. Further, each of the foreground extraction apparatuses 102a through 102r generates a foreground mask image, which indicates a foreground area of a captured image and the other area, and a foreground texture image, which is an image indicating the texture of the foreground, for each corresponding camera.

Figure 5:
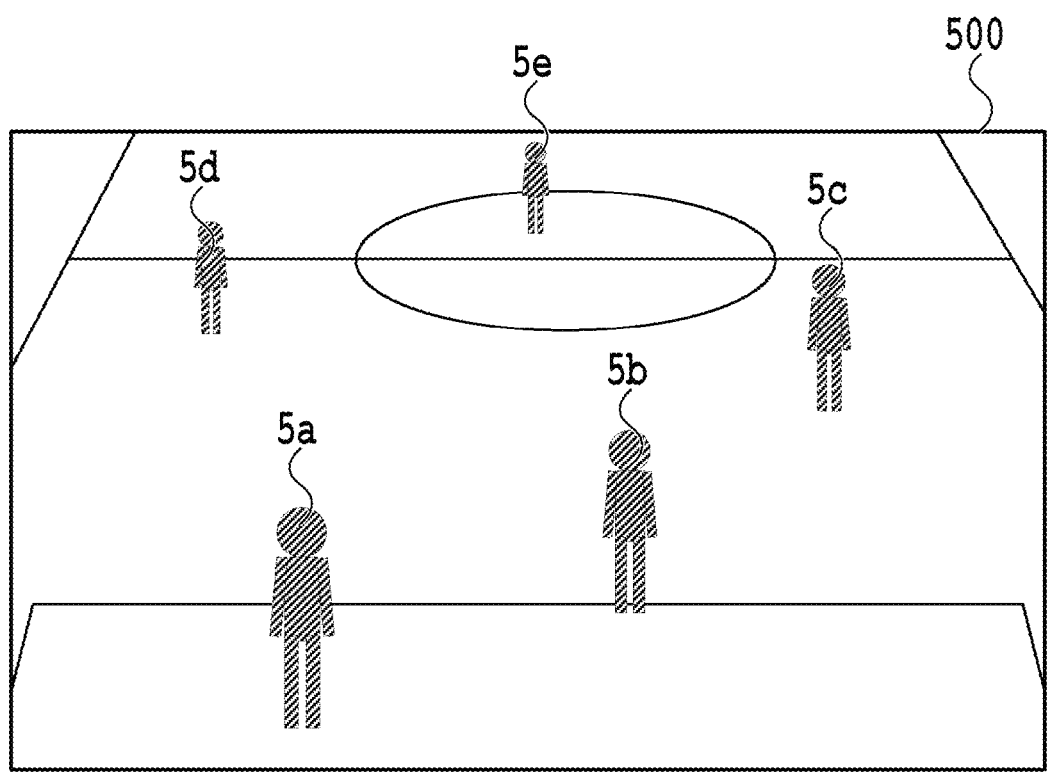
FIG. 5 is a figure illustrating an image captured by a camera.
Figure 6:
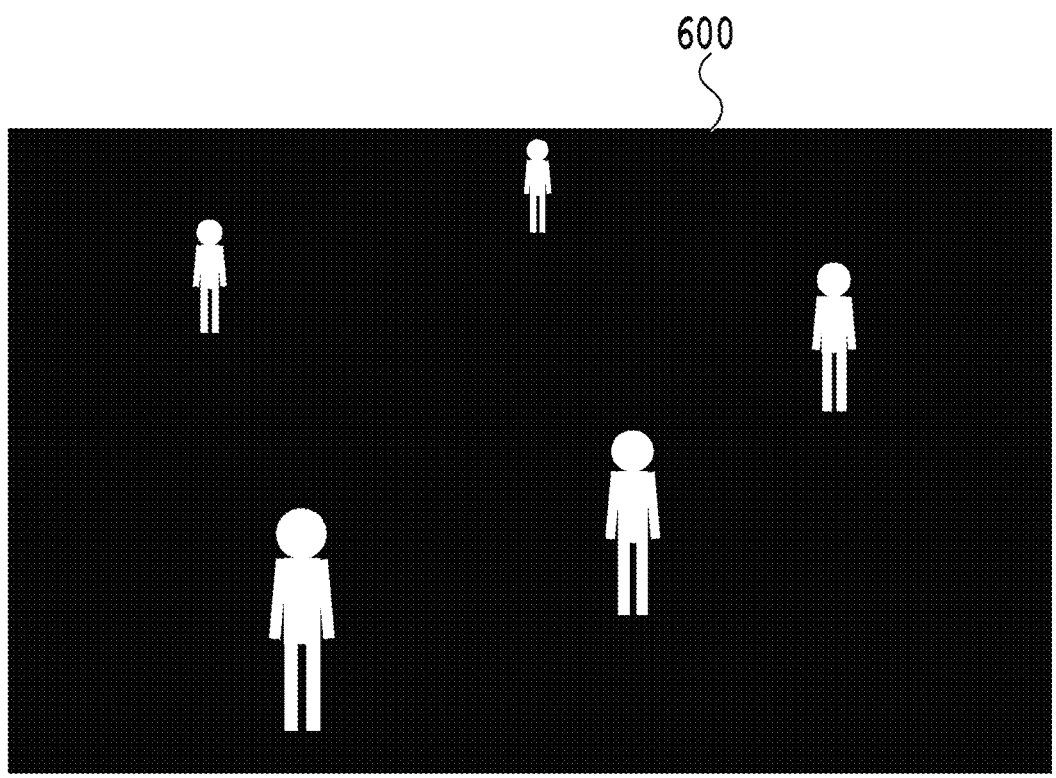
FIG. 6 is a figure illustrating a foreground mask image.

Here, an explanation is given of a captured image, a foreground mask image, and a foreground texture image with reference to the drawings. FIG. 5 is a figure illustrating a captured image 500 obtained by capturing an image of the gazing point 401 of the field 400 by the camera 101m of FIG. 4, which is one of the cameras belonging to the camera array 101. The captured image 500 includes five foregrounds 5a through 5e. FIG. 6 is an example of a foreground mask image 600 in which the foregrounds of the captured image 500 in FIG. 5 are illustrated as the foreground areas. As with the foreground mask image 600 in FIG. 6, a foreground mask image is represented as a binary image. In the explanation of the present embodiment, it is assumed that a foreground mask image is a binary image in which a foreground area indicating the area of a foreground is represented as white and the area other than the foreground area is represented as black. A foreground mask image is used in generation of a three-dimensional model of a foreground to be described later.

Figure 7A:
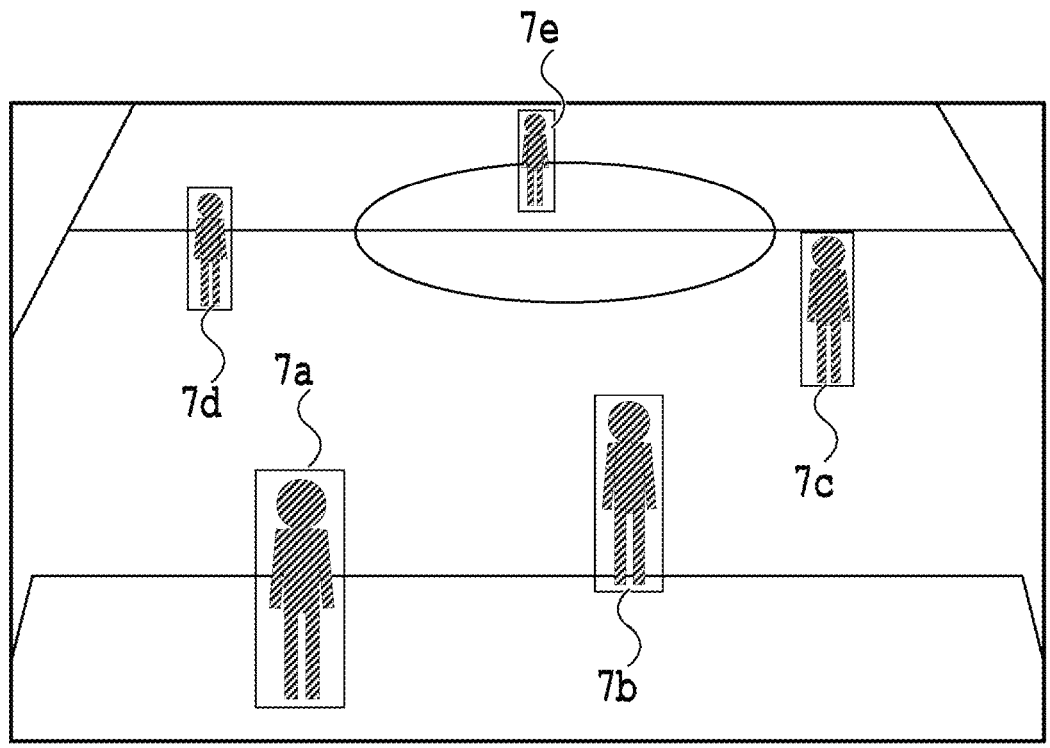
FIGS. 7A and 7B are figures illustrating foreground texture images.

In addition, the each of the foreground extraction apparatuses 102a through 102r calculates a rectangular area including a foreground from an image captured by the corresponding camera. FIG. 7A is a figure in a case where the foreground extraction apparatus 102m detects the foregrounds from the captured image 500 of FIG. 5 and detects the areas including the foregrounds as rectangular areas. Since there are five foregrounds in the captured image 500 of FIG. 5, it is illustrated that five rectangular areas are detected in FIG. 7A.

There is no limitation regarding the method for detecting a foreground from a captured image as illustrated in FIGS. 6 and 7A. For example, a method may be used in which a pixel value of a background image, which corresponds to a captured image and is held in advance, and a pixel value of the captured image are compared, so that an area configured with pixels of which the value difference based on the pixel values exceeds a threshold value is determined as a foreground area.

Figure 7B:
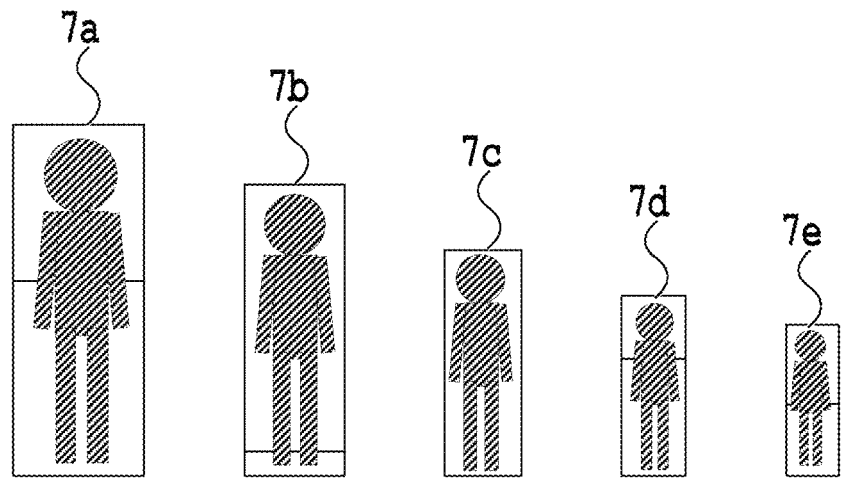

FIG. 7B illustrates respective rectangular images obtained by clipping the rectangular areas calculated in FIG. 7A. The rectangular images are referred to as foreground texture images 7a through 7e. The foreground texture images 7a through 7e are used for coloring a three-dimensional model of a foreground.

The control apparatus 103 calculates camera parameters, which indicate the positions and orientations of the cameras 101a through 101r, from image data of images captured synchronously in terms of time by the cameras of the camera array 101. Further, the control apparatus 103 outputs the camera parameters to the generation apparatus 104 and the rendering apparatus 105.

The camera parameters include an extrinsic parameter and an intrinsic parameter. An extrinsic parameter is configured with a rotation matrix and a translation matrix and indicates the position and orientation of a camera. On the other hand, an intrinsic parameter includes the optical center and the focal length of a camera, or the like, and indicates the angle of view of a camera, the size of an imaging sensor, or the like. The process of calculating camera parameters is called calibration. Camera parameters can be obtained by use of a correspondence relation between points on the three-dimensional world coordinate system, which is acquired by use of multiple images in which a specific pattern such as a checkerboard is captured, and points on a two-dimension corresponding thereto.

The generation apparatus 104 acquires camera parameters from the control apparatus 103 and acquires a foreground mask image and a foreground texture image from the foreground extraction apparatus group 102. Further, the generation apparatus 104 generates a three-dimensional model of a foreground from the acquired foreground mask image. The generation apparatus 104 outputs data of the generated three-dimensional model of a foreground to the rendering apparatus 105. Details of processing performed by the generation apparatus 104 is described later.

The rendering apparatus 105 acquires a three-dimensional model of a foreground, a foreground texture image, and a result of determination of visibility, which is described later, from the generation apparatus 104. Furthermore, the rendering apparatus 105 acquires camera parameters from the control apparatus 103. The rendering apparatus 105 generates a virtual viewpoint image based on the above-mentioned data. Specifically, a positional relationship between a foreground texture image and a three-dimensional model of a foreground is obtained from camera parameters, and each voxel configuring the three-dimensional model is colored based on color of pixels of the foreground texture image. An explanation of voxels is given later. The virtual viewpoint image may be a moving image or a still image.

Note that, although the present embodiment is a mode in which the foreground extraction apparatuses 102a through 102r and the generation apparatus 104 are connected in a star-type topology, there may be a mode in which the foreground extraction apparatuses 102a through 102r and the generation apparatus 104 are connected in a ring-type or bus-type topology, etc., by daisy chain connection.

[Functional Configuration of Generation Apparatus]

Figure 8:
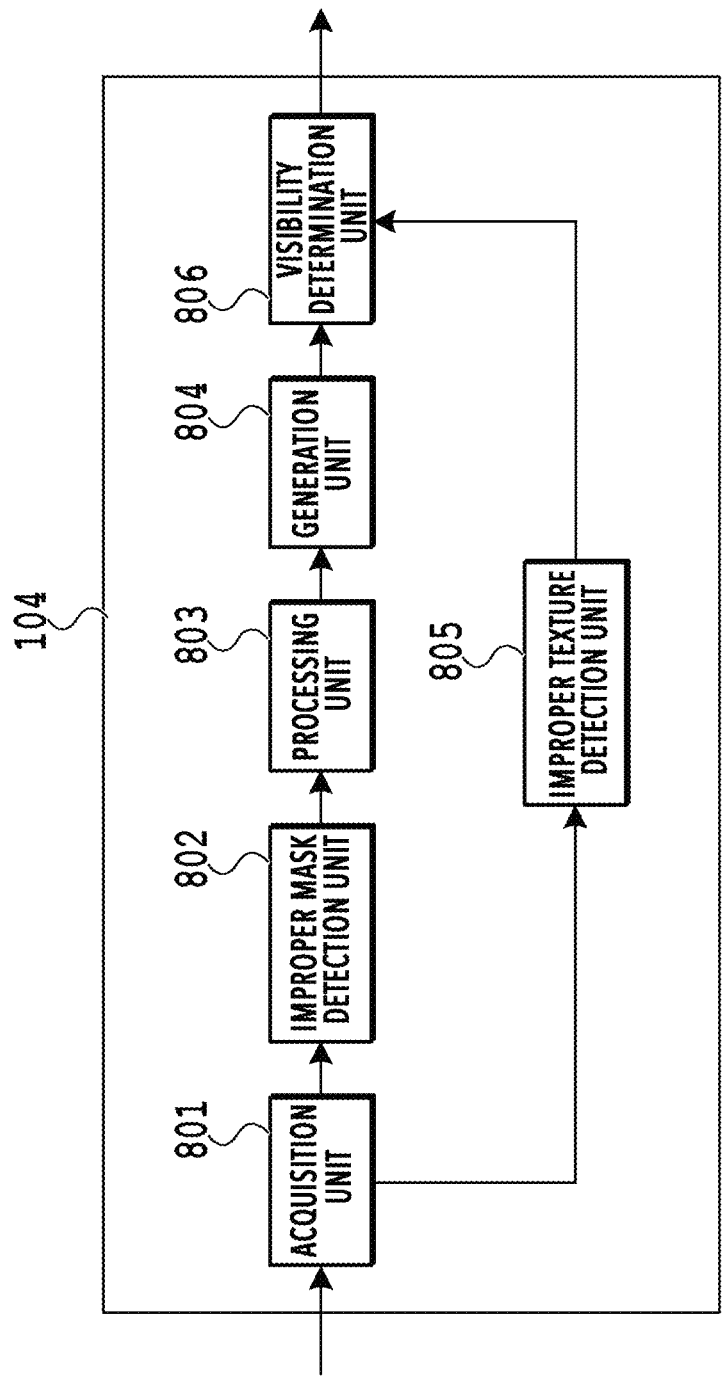
FIG. 8 is a figure illustrating functional blocks of the generation apparatus.

FIG. 8 is a block figure illustrating a functional configuration of the generation apparatus 104 of the present embodiment. The generation apparatus 104 includes an acquisition unit 801, an improper mask detection unit 802, a processing unit 803, a generation unit 804, an improper texture detection unit 805, and a visibility determination unit 806.

The acquisition unit 801 acquires foreground mask images, foreground texture images, etc., which are based on captured images of respective cameras 101a through 101r, from the foreground extraction apparatuses 102a through 102r. The improper mask detection unit 802 detects an "improper" foreground mask image, which is not normal, from among the foreground mask images acquired by the acquisition unit 801. Note that, here, in a case where the acquisition unit 801 cannot acquire a part of the foreground mask images that should be acquired, the foreground mask image that cannot be acquired is processed as an "improper" foreground mask image as well. For example, in a case where a foreground mask image is not output by the foreground extraction apparatuses 102a through 102 due to a failure, or the like, it may not be possible to acquire the foreground mask image.

The processing unit 803 performs processing for inhibiting the influence of an improper foreground mask image on generation of a three-dimensional model of a foreground. An explanation of the processing is given later.

The generation unit 804 generates a three-dimensional model of a foreground by the volume intersection method from multiple foreground mask images based on images captured by the cameras of the camera array 101 and camera parameters indicating the positions and orientations of the camera array 101. Then, the generation unit 804 outputs the three-dimensional model of a foreground to the visibility determination unit 806.

The improper texture detection unit 805 detects an improper foreground texture image from among the foreground texture images acquired by the acquisition unit 801. Further, in a case where the acquisition unit 801 cannot acquire a part of the foreground texture images that should be acquired, the foreground mask image that cannot be acquired is processed as an "improper" foreground texture image as well. For example, in a case where a foreground texture image is not output by the foreground extraction apparatuses 102a through 102 due to a failure, or the like, it may not be possible to acquire the foreground texture image.

The visibility determination unit 806 determines whether each voxel configuring a three-dimensional model of a foreground is inside the angle of view of each camera configuring the camera array 101. The result of determination by the visibility determination unit 806 is used by the rendering apparatus 105 for coloring each voxel configuring the three-dimensional model of a foreground.

[Explanation of Processing by Processing Unit]

In the first embodiment, as the processing for inhibiting the influence of an improper foreground mask image on generation of a three-dimensional model of a foreground, the processing unit 803 performs a process of replacing an improper foreground mask image with an image of which the entire area is a foreground area. Since the color indicating a foreground area is white in the present embodiment, a process of replacing an improper foreground mask image with an image of which the entire area is white (all-white image) is performed. Note that, in a case where a foreground mask image that should be acquired is not acquired by the acquisition unit 801, the processing unit 803 puts the image whose entire area is a foreground area into the processing, instead of the foreground mask image.

Figure 9A:
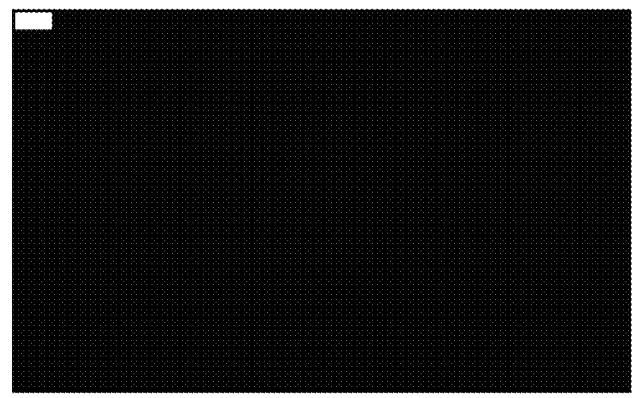
FIGS. 9A through 9C are figures illustrating processing for replacing an improper foreground mask image with an all-white image.

Here, the process by the processing unit 803 in the present embodiment is explained with reference to the drawings. FIG. 9A is a figure illustrating an example of an improper foreground mask image. There is a case in which, although an object to be a foreground is included inside the angle of view of a camera, the foreground area is not properly extracted from a captured image of the camera due to a failure of the camera, or the like. For this reason, there is a case in which such an improper foreground mask image that barely includes a white area, which indicates a foreground area, as illustrated in FIG. 9A is acquired.

As described above, a three-dimensional model of a foreground is generated from the same area of respective view volumes obtained from foreground areas of multiple viewpoints. That is, basically, a three-dimensional model of a foreground is generated based on the same area in which the view volumes of all the cameras at positions where an image of the object to be the foreground is captured cross each other. However, such an improper foreground mask image as illustrated in FIG. 9A barely includes a foreground area, compared to a normal foreground mask image. Therefore, since there is almost no view volume corresponding to an improper foreground mask image, compared to the view volumes corresponding to normal mask images, the view volume corresponding to an improper foreground mask image does not cross with the view volumes from other cameras. Thus, there is a possibility that generation of a three-dimensional model of a foreground is not properly performed since the view volumes of all cameras do not cross each other in the same area.

Figure 9B:
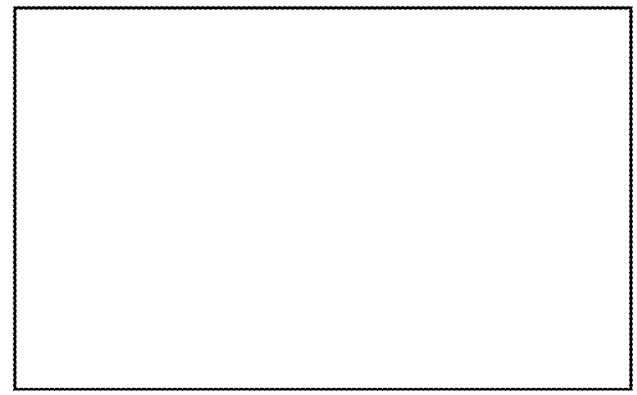
Figure 9C:
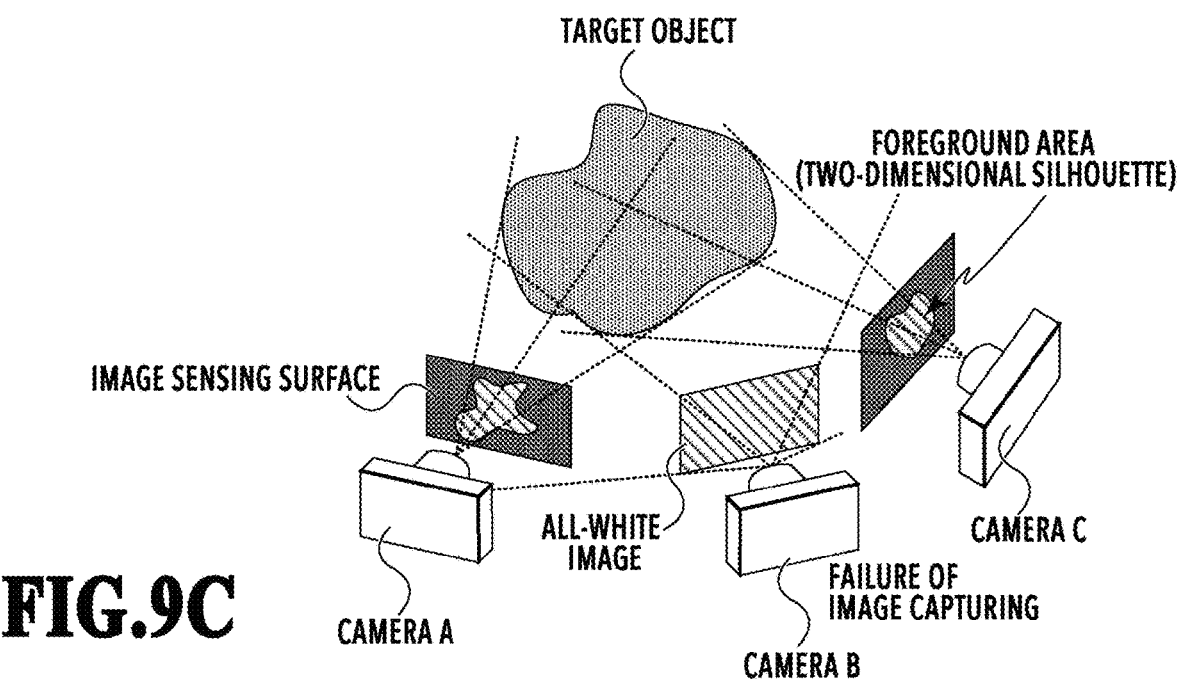

FIG. 9B is a figure illustrating that the improper foreground mask image has been replaced with an all-white image as a result of the process performed by the processing unit 803 on the improper foreground mask image of FIG. 9A. Further, FIG. 9C illustrates a situation in which, as a result of replacement of an improper foreground mask image with an all-white image, a three-dimensional model of a foreground is generated from the view volumes of a foreground mask image that has been replaced with an all-white image and the other foreground mask images that are normal. Since a foreground area is a white area, the entire area of the foreground mask image that has become the all-white image is a foreground area. Therefore, the view volume passing through the foreground area of the all-white image is the maximum. Accordingly, the same area of the view volumes based on the other foreground mask images that are normal (the view volumes of the camera A and the camera C in FIG. 9C) crosses with the view volume based on the foreground mask image that has become the all-white image (the view volume of the camera B in FIG. 9C). Thus, it is possible to inhibit a three-dimensional model of a foreground from being unnecessarily scraped due to the influence of an improper foreground mask image. That is, it is possible to produce the same effect as a case in which a three-dimensional model of a foreground is generated only from the same area of view volumes based on normal foreground mask images.

In the explanation of the present embodiment, it is assumed that the process of replacing an improper foreground mask image with an all-white image is performed. However, the white area of an image with which an improper foreground mask image is replaced may not be the entire area of the image. The view volume passing through the foreground area of the image replaced by the processing unit 803 only needs to be large enough to cross with the view volumes of other cameras.

In this way, by replacing an improper foreground mask image with an all-white image, there is no need of a setting for excluding an improper foreground mask image in the subsequent process of generating a three-dimensional model of a foreground, and, therefore, the sequence to the process of generating a three-dimensional model of a foreground becomes easy.

Note that, as another mode, there may be a mode of generating a foreground mask image in which the area that indicates a foreground area is black and the area other than the foreground area is indicated as white. In such a mode, the processing unit 803 performs a process of making the entire area of an improper foreground mask image into black, which indicates a foreground area. In any case, the processing unit 803 performs a process so as to replace an improper foreground mask image with an image of which the entire area is a foreground area.

[Flowchart]

Figure 10:
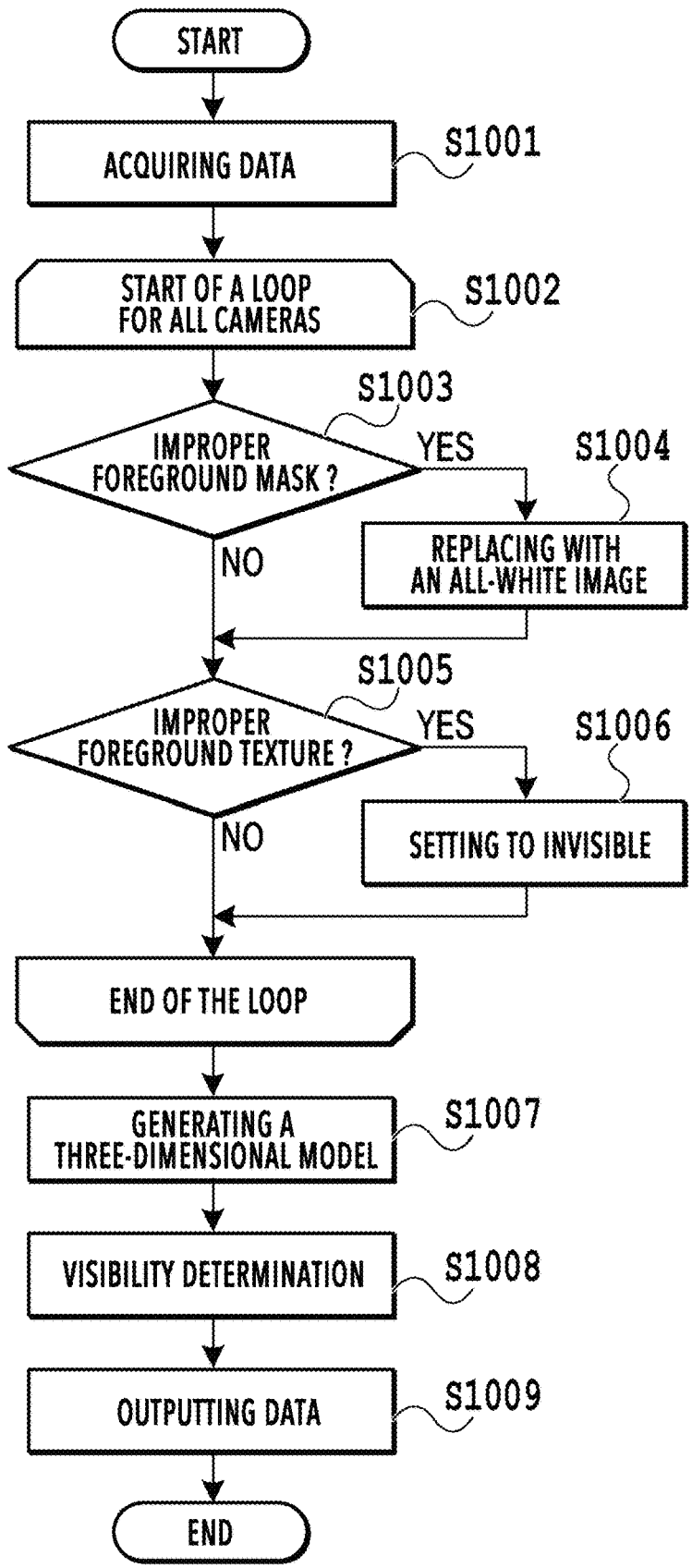
FIG. 10 is a flowchart figure illustrating processing by the generation apparatus.

FIG. 10 is a figure illustrating an example of a flowchart of the processing performed by the generation apparatus 104 for generating a three-dimensional model of a foreground. The series of processes illustrated in the flowchart of FIG. 10 is performed by the CPU of the generation apparatus 104 retrieving a program code stored in the ROM into the RAM and executing the program code. Note that the symbol "S" in the explanation of each process means that it is a step in the flowchart. The series of processes for generating a three-dimensional model of a foreground is explained with reference to FIG. 10.

In S1001, the acquisition unit 801 acquires a foreground mask image and a foreground texture image generated by the foreground extraction apparatus group 102 based on captured images that are synchronously captured by respective cameras of the camera array 101. Further, camera parameters of each camera configuring the camera array 101 are acquired from the control apparatus 103.

Hereinafter, S1003 through S1006 are repeated for all foreground mask images and all foreground texture images, each of which is based on a processing target camera among the cameras 101a through 101r configuring the camera array 101.

That is, in S1002, a processing target camera is selected from among unprocessed cameras configuring the camera array 101, and the processes of S1003 through S1006 are performed on a foreground mask image and a foreground texture image corresponding to the processing target camera. Once the processes on the processing target camera are completed, another processing target camera is selected from among unprocessed cameras. In a case where there are no more unprocessed cameras, the processing proceeds to S1007.

In S1003, the improper mask detection unit 802 detects whether the foreground mask image of the processing target camera is improper. Image data of a foreground mask image includes a data header to which information about the captured image, based on which the foreground mask image is generated, is added, for example. As a method for the improper mask detection unit 802 to detect whether a foreground mask image is improper, the improper mask detection unit 802 detects that the foreground mask image is improper in a case where the information included in the data header of the foreground mask image does not match the image or in a case where the information in the data header includes an abnormal value. For example, the improper mask detection unit 802 detects that the foreground mask image is an improper image in a case where the data header does not include information that is supposed to be included in the data header or in a case where the number of foregrounds, which is stored in the data header of the foreground mask image, does not match the number of foreground areas of the acquired foreground mask image.

The method for the improper mask detection unit 802 to detect whether the foreground mask image is improper is not limited thereto. Furthermore, there may be a method in which the foreground mask image is detected as an improper foreground mask image in a case where the data size of the foreground mask image is not normal. Alternatively, there may be a method in which the improper mask detection unit 802 compares foreground pixel values of the captured image from the processing target camera and foreground pixel values of a captured image from another camera, and, in a case where the difference thereof is equal to or greater than a threshold value, the improper mask detection unit 802 detects that the foreground mask image from the processing target camera is an improper image. Additionally, there may be a method in which the foreground mask image is detected to be improper in a case where the checksum, which indicates the consistency of the image data of the foreground mask image, is not correct.

Alternatively, there may be a method in which, in a case where the acquisition unit 801 cannot acquire image data of a foreground mask image from the foreground extraction apparatus group 102, the improper mask detection unit 802 also detects that the foreground mask image from the processing target camera is an improper foreground mask image. Specifically, the improper mask detection unit 802 determines whether the foreground mask image of the processing target camera has been acquired or not based on the camera number included in the data header of the foreground mask image. That is, the improper mask detection unit 802 may detect that the foreground mask image corresponding to the camera number of the processing target camera has not been acquired. Here, in a case where a foreground mask image, which is a foreground mask image of a processing target camera, has not been acquired, the determination of S1003 results in YES as well.

In a case where the foreground mask image is detected to be an improper foreground mask image (S1003: YES), the processing unit 803 performs the process of replacing the improper foreground mask image with an all-white image in S1004. Then, the all-white image is output to the generation unit 804 as the foreground mask image of the processing target camera. In a case where the process of S1004 is completed or in a case where the foreground mask image is not detected to be improper (S1003: NO), the processing proceeds to S1005. Note that, in a case where a foreground mask image, which is a foreground mask image of a processing target camera, has not been acquired, processing in which an all-while image is used as a foreground mask image corresponding to the camera number of the processing target camera is performed.

In S1005, the improper texture detection unit 805 detects an improper image from the foreground texture image of the processing target camera. As a method for the improper texture detection unit 805 to detect whether a foreground texture image is improper, the same kind of method as the method in which the improper mask detection unit 802 detects an improper foreground mask image in S1003 may be used. For example, in a case where information included in the data header included in the image data of the acquired foreground texture image does not match the image or in a case where information in the data header includes an abnormal value, the foreground texture image is detected as an improper image.

Further, the improper texture detection unit 805 may determine whether a foreground texture image of a processing target camera has been acquired based on the camera number included in the data header of the foreground texture image. That is, the improper texture detection unit 805 may detect that the foreground texture image that corresponds to the camera number of the processing target camera has not been acquired. Here, in a case where a foreground texture image, which is a foreground texture image of a processing target camera, has not been acquired, the determination of S1005 results in YES as well.

In a case where the foreground texture image is detected as an improper image (S1005: YES), the visibility determination unit 806 acquires information about the processing target camera in S1006. Then, the visibility determination unit 806 sets "visibility" of the foreground texture image based on the processing target camera to invisible. By setting the visibility to invisible, it is possible to prevent the rendering apparatus 105 from performing coloring based on an improper foreground texture image at the time of coloring a three-dimensional model of a foreground, which is performed after the present flowchart is completed. In a case where the processes are completed for all cameras or in a case where the foreground texture image is not detected to be improper (S1005: NO), the processing proceeds to S1007. Note that, in a case where a foreground texture image, which is a foreground texture image of a processing target camera, has not been acquired, processing in which another image is used as the foreground texture image that corresponds to the camera number of the processing target camera may be performed, and the "visibility" thereof is set to invisible in S1006. As another image, an image of which the pixel value of each pixel is 0 or an image of another camera number may be used.

Note that the present embodiment is a mode in which the detection for an improper image is performed on both of the foreground mask image and the foreground texture image. Furthermore, there may be a mode in which the detection for an improper image is performed on either one of the foreground mask image and the foreground texture image, and, in a case where the foreground mask image or the foreground texture image is detected to be improper, the other image is automatically regarded as an improper image and the subsequent processes are performed. For example, the process of S1005 is not performed, and the improper mask detection unit 802 only detects whether the foreground mask image from the processing target camera is an improper image in S1003. There may be a mode in which, in a case where the improper mask detection unit 802 detects that the foreground mask image is improper, the foreground texture image of the processing target camera is also regarded as an improper image, and the process of S1006 is performed.

In S1007, the generation unit 804 generates a three-dimensional model of a foreground based on normal foreground mask images from respective cameras and images processed by the processing unit 803. In the present embodiment, the procedure as described below is performed by using voxels as elements configuring the three-dimensional space.

Figure 11A:
FIGS. 11A through 11C are figures illustrating a three-dimensional model of a foreground represented by voxels.
Figure 11B:
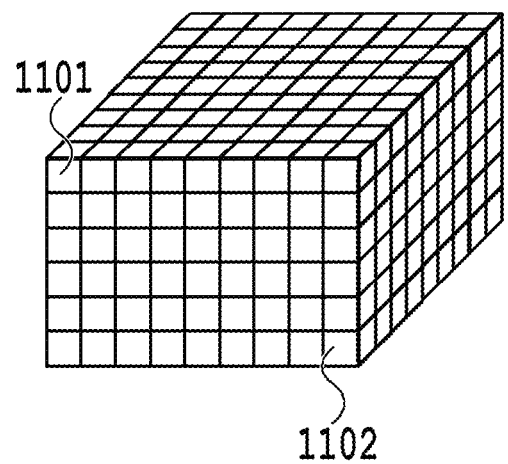
Figure 11C:
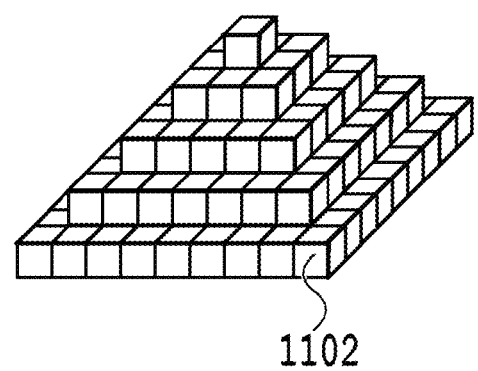

FIGS. 11A through 11C are figures for explaining voxels. A voxel is such a minute cube as illustrated in FIG. 11A. FIG. 11B illustrates a subject space captured by cameras for generating a three-dimensional model of a foreground, which is represented as a collection of voxels.

One target voxel, which is a target voxel among the voxels in the subject space, is projected onto a foreground mask image of each camera, and then whether or not the projection of the target voxel is inside a foreground area of the foreground mask image of each camera is determined. As a result of this determination, in a case where, among foreground mask images of respective cameras, there is even one foreground mask image whose foreground area does not include the projection of the target voxel, the target voxel is deleted.

Contrarily, in a case where the projection of the target voxel is inside foreground areas of the foreground mask images from all cameras that capture the subject space, the target voxel is determined as a voxel configuring a foreground, and, therefore, the target voxel remains. The generation unit 804 performs the above-described series of processes on all voxels in the subject space so as to form a three-dimensional model of a foreground.

FIG. 11C is a figure illustrating that a three-dimensional model of a foreground in a shape of a quadrangular pyramid is generated with voxels by deleting voxels of FIG. 11B that are not inside foreground areas of any one of the cameras. For example, in a case where the voxel 1101 in the figure of FIG. 11B is the target voxel, the voxel 1101 is deleted since there is a foreground mask image whose foreground area does not include the projection of the voxel 1101. On the other hand, in a case where the voxel 1102 in the figure of FIG. 11B is the target voxel, the voxel 1102 remains since the projection of the voxel 1102 is inside foreground areas of the foreground mask images of all cameras that capture the subject space. In this way, the three-dimensional model of a foreground of FIG. 11C is generated.

Note that, although a three-dimensional model of a foreground is represented with cubic voxels in the present embodiment, the present embodiment is not limited thereto. Alternatively, for example, a three-dimensional model of a foreground may be represented with a point cloud, using points as elements configuring the three-dimensional space.

In S1008, the visibility determination unit 806 performs "visibility determination" on the generated three-dimensional model of a foreground so as to determine from which camera the surface of each voxel on the surface of the three-dimensional model of a foreground can be viewed. Improper foreground texture images detected by the improper texture detection unit 805 in S1006 are set as invisible. In a case where a foreground texture image is set as invisible, even though there is a voxel inside the angle of view of a camera that captured a image based on which the foreground texture image is generated, the visibility determination unit 806 does not determine that the camera is able to view the voxel. Further, the result of determination by the visibility determination unit 806 is output to the rendering apparatus 105 in S1009.

As a subsequent process of generating a virtual viewpoint image, the rendering apparatus 105 determines the color of surfaces of voxels by use of the foreground texture images of the cameras determined to be able to view the surfaces of the voxels in the visibility determination. Therefore, since the visibility determination unit 806 sets an improper foreground texture image as invisible, it is possible to prevent the rendering apparatus 105 from performing coloring by use of improper foreground texture images.

In S1009, the visibility determination unit 806 outputs the three-dimensional model of a foreground, the foreground texture images, and the results of determination of visibility to the rendering apparatus 105.

The above is the content of the processing for generating a three-dimensional model of a foreground according to the present embodiment. In a case of generating a virtual viewpoint image of a moving image, the process of each step described above is repeatedly performed on a per frame basis so as to generate a three-dimensional model of a foreground for each frame. As a subsequent process, a virtual viewpoint image is generated by the rendering apparatus 105.

As explained above, according to the present embodiment, by replacing improper foreground mask images with all-white images, it is possible to inhibit defects of a three-dimensional model of a foreground generated due to the improper foreground mask images. Therefore, it is possible to generate a three-dimensional model of a foreground from which the influence of improper foreground mask images is removed. Further, by setting improper foreground texture images as invisible, it is possible to prevent a three-dimensional model of a foreground from being colored by use of the improper foreground texture images. Therefore, it is possible to generate a virtual viewpoint image with inhibited image quality deterioration.

Second Embodiment

In the first embodiment, since improper foreground mask images are processed so as to become all-white images, even in a case where a normal foreground area is included in a part of an improper foreground mask image, the normal foreground area is not used for generating a three-dimensional model of a foreground. For example, in the first embodiment, in a case where the foreground mask images of all the cameras are improper, a three-dimensional model of a foreground is generated without deleting the collection of voxels. The present embodiment is a mode in which a foreground rectangular mask image, which is generated for each foreground area, is used, so as to detect an improper area out of foreground mask image by detecting each foreground rectangular mask image.

Therefore, in the present embodiment, in a case where a normal foreground area is included in a part of a foreground mask image, the normal foreground area can be contributed to generation of a three-dimensional model of a foreground. As for the present embodiment, differences from the first embodiment are mainly explained. Not-specified parts have the same configuration and processing as those in the first embodiment.

Figure 12:
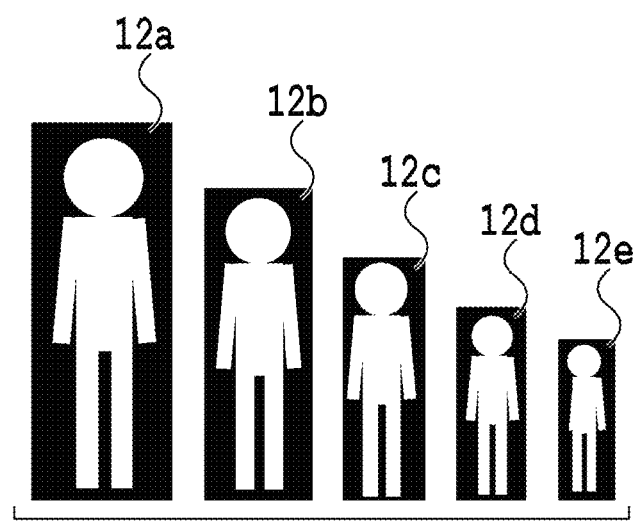
FIG. 12 is a figure illustrating foreground rectangular mask images.

The processing by each of the foreground extraction apparatuses 102*a* through 102*r* in the foreground extraction apparatus group 102 in the present embodiment is explained with reference to the drawings. FIG. 12 illustrates binary images based on the foreground areas extracted from the foreground texture images 7*a* through 7*e* illustrated in FIG. 7B, in which the foreground areas are represented as white and the areas other than the foregrounds are represented as black. The binary images for respective foregrounds are referred to as foreground rectangular mask images 12*a* through 12*e*. The foreground extraction apparatuses 102*a* through 102*r* corresponding to the respective cameras 101*a* through 101*r* generate such a foreground rectangular mask image, in addition to a foreground mask image and a foreground texture image as explained in the first embodiment. Further, the foreground extraction apparatuses 102*a* through 102*r* calculate the coordinates of a foreground rectangular mask image on a foreground mask image and transmit each of the data to the generation apparatus 104.

For generating the foreground mask image 600 of FIG. 6, the foreground extraction apparatuses 102*a* through 102*r* may generate the foreground mask image by synthesizing, that is, by pasting multiple foreground rectangular mask images 12*a* through 12*e* to the corresponding coordinates.

[Flowchart]

Figure 13:
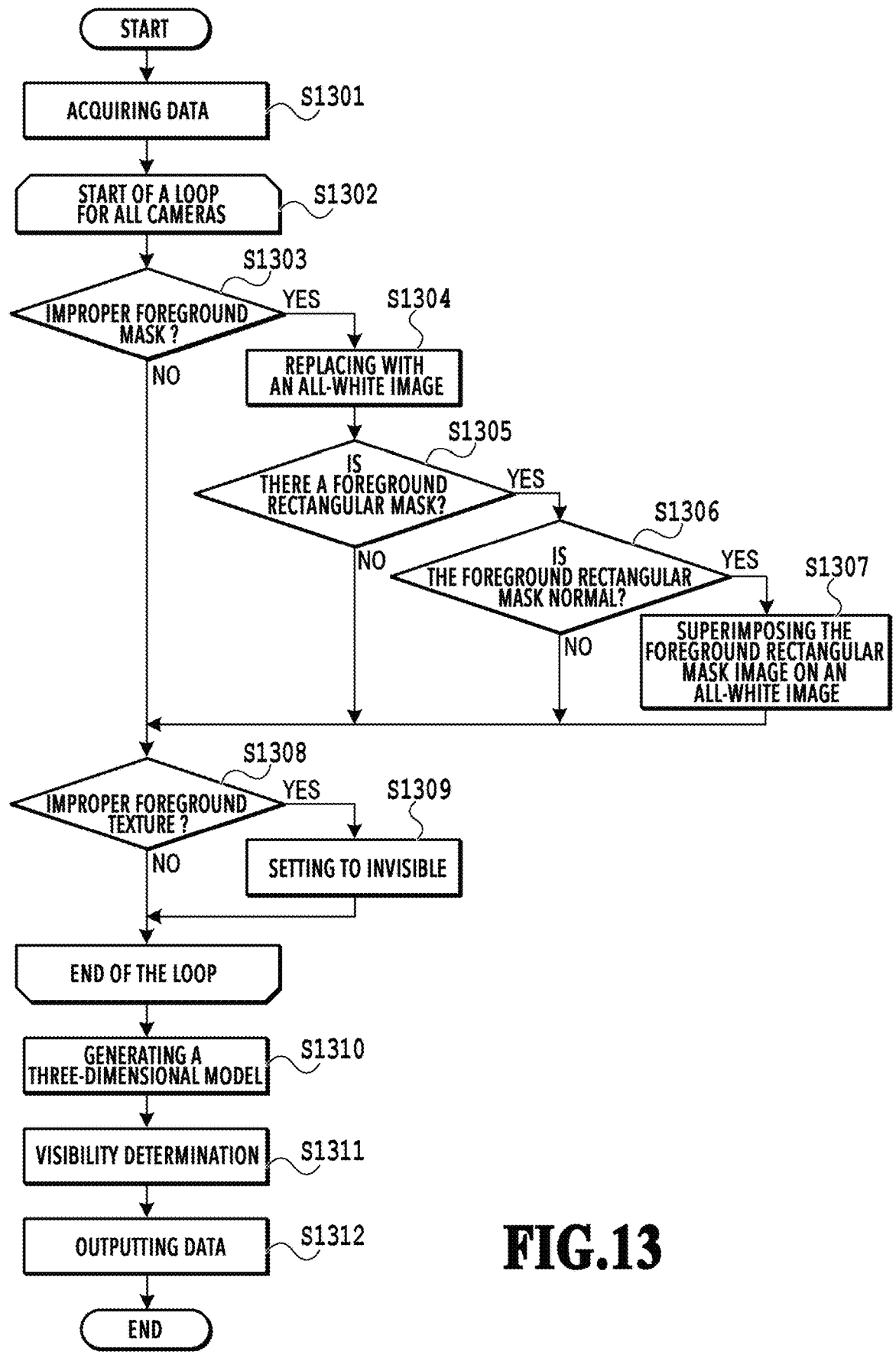
FIG. 13 is a flowchart figure illustrating processing by the generation apparatus.

FIG. 13 is a figure illustrating an example of a flowchart for explaining the processing for generating a three-dimensional model, which is performed by the generation apparatus 104 according to the present embodiment.

In S1301, the acquisition unit 801 acquires a foreground mask image, a foreground texture image, a foreground rectangular mask image, and the coordinates of the foreground rectangular mask image on the foreground mask image corresponding to each of the cameras 101*a* through 101*r* from the foreground extraction apparatuses 102*a* through 102*r*.

Since the processes of S1302 through S1304 are identical to the processes of S1002 through S1004, the explanations thereof are omitted.

In a case where the foreground mask image of the processing target camera is improper, the improper mask detection unit 802 determines, in S1305, whether a foreground rectangular mask image based on the image captured by the processing target camera has been acquired. This is because even though the foreground mask image is detected to be improper, a foreground rectangular mask image may be transmitted.

In a case where it is determined that a foreground rectangular mask image has been acquired (S1305: YES), the improper mask detection unit 802 determines, in S1306, whether a foreground rectangular mask image for each foreground is normal. As a method for detecting a normal (not improper) image from foreground rectangular mask images, the same kind of method as the method for detecting an improper foreground mask image in S1303 may be used. For example, in a case where information in the data header included in image data of each foreground rectangular mask image does not match the image or in a case where information in the data header includes an abnormal value, the foreground rectangular mask image is detected to be improper. A method in which a foreground rectangular mask image is regarded as a normal image in a case where the foreground rectangular mask image is not detected to be improper may be used.

In a case where there is a normal foreground rectangular mask image, which is not improper (S1306: YES), the processing unit 803 performs, in S1307, a process of superimposing the normal foreground rectangular mask image on the foreground mask image that was replaced with an all-white image in S1304. The image obtained as a result of the process is output to the generation unit 804 as a foreground mask image of the processing target camera. In a case where there are multiple normal foreground rectangular mask images, a process of superimposing the multiple normal foreground rectangular mask images on an all-white image is performed. The processing unit 803 replaces the foreground mask image of the processing target camera with the image on which the foreground rectangular mask images are superimposed and outputs the image to the generation unit 804.

Figure 14A:
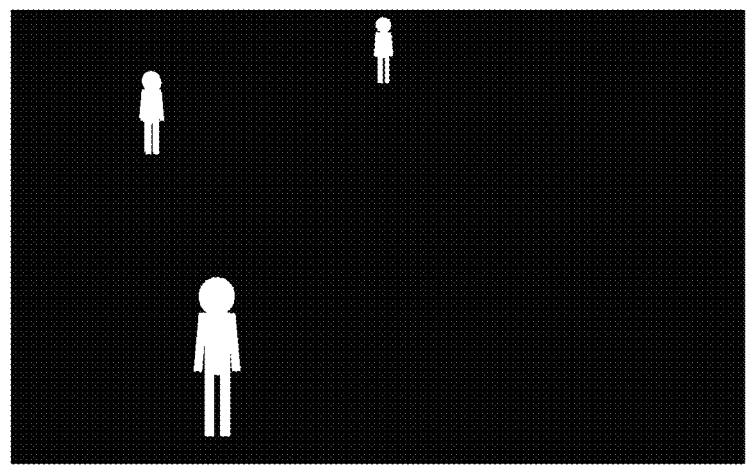
FIGS. 14A through 14C are figures illustrating processing by use of foreground rectangular mask images.

FIG. 14A is a figure illustrating an improper foreground mask image including only three foreground areas although the image should have included five foreground areas as in the foreground mask image 600 of FIG. 6 if the foreground mask image were a normal foreground mask image. In a case where three-dimensional models of foregrounds are generated from the improper foreground mask image of FIG. 14A, the three-dimensional models of the foregrounds that are not recognized as the foreground areas are scraped and the quality thereof is deteriorated. On the other hand, in a case where the improper foreground mask image of FIG. 14A is replaced with an all-white image as in the first embodiment, the foreground areas that normally represent foreground silhouettes are not used for generating the three-dimensional models of the foregrounds as well.

Figure 14B:
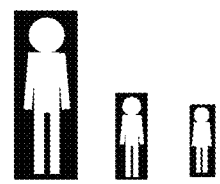
Figure 14C:
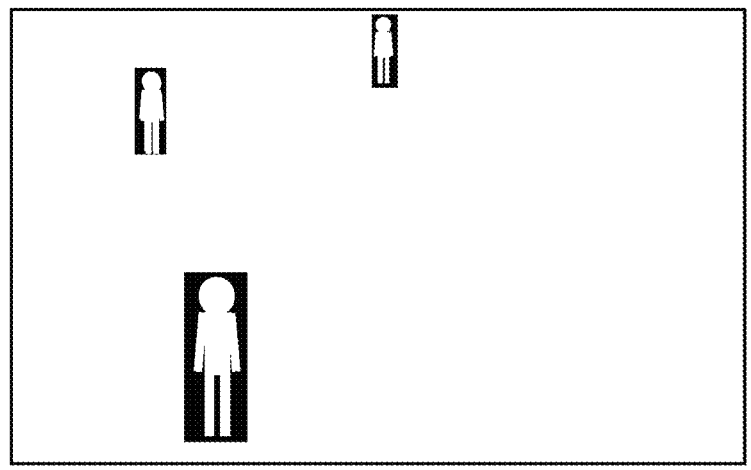

FIG. 14B is an example of normal foreground rectangular mask images included in the improper foreground mask image of FIG. 14A. FIG. 14C is a foreground mask image obtained by the process of superimposing normal foreground rectangular mask images on an all-white image. By using the foreground mask image for generation of three-dimensional models of foregrounds, the normal foreground rectangular mask images can be contributed to the three-dimensional models of the foregrounds. Further, for generation of three-dimensional models of foregrounds whose foreground areas were not able to be normally extracted, the three-dimensional models can be generated without being scraped due to the improper foreground mask image.

Note that, as a method for generating such a foreground mask image as illustrated in FIG. 14C, an explanation has been given of the method of superimposing a normal foreground rectangular mask image on an all-white image. Alternatively, a method in which the processing unit 803 detects a rectangular area including a normal foreground area from an improper foreground mask image and performs a process of making the area other than the rectangular area including the normal foreground area into a white area, so as to use the processed image as a foreground mask image, may be used.

In a case where a foreground rectangular mask image cannot be acquired (S1305: NO) or in a case where there is no normal foreground rectangular mask image (S1306: NO), the processing unit 803 replaces the improper foreground mask image with an all-white image. The processing unit 803 outputs the replaced all-white image to the generation unit 804 as the foreground mask image of the processing target camera.

In S1308, the improper texture detection unit 805 detects an improper image from the foreground texture image of the processing target camera. As a method for the improper texture detection unit 805 to detect whether a foreground texture image is improper, a method in which a foreground texture image corresponding to a foreground rectangular mask image that is detected to be improper in S1306 is also detected to be improper may be used, in addition to the method explained in S1005. Since the processes of S1309 through S1312 are identical to the processes of S1006 through S1009, the explanations thereof are omitted.

As explained above, according to the present embodiment, an area that normally represents a foreground area can be contributed to generation of the three-dimensional model of the foreground even though the area is in an improper foreground mask image. That is, in the present embodiment, processing for inhibiting the influence on generation of a three-dimensional model is performed on the area other than the normal foreground areas in an improper foreground mask image. By the processing as such, it is possible to reduce the influence of an improper foreground mask image on generation of a three-dimensional model of a foreground, so as to realize generation of a virtual viewpoint image with reduced image quality degradation.

Third Embodiment

In the present embodiment, in a case where an acquired foreground mask image is detected to be improper, a process of enlarging a foreground area of an immediately preceding normal foreground mask image is performed. In this mode, by replacing an improper foreground mask image with an image on which the enlarging process has been performed, quality deterioration of a three-dimensional model of a foreground due to the improper foreground mask image is inhibited. As for the present embodiment, differences from the first embodiment are mainly explained. Not-specified parts have the same configuration and processing as those in the first embodiment.

[Functional Configuration of Generation Apparatus]

Figure 15:
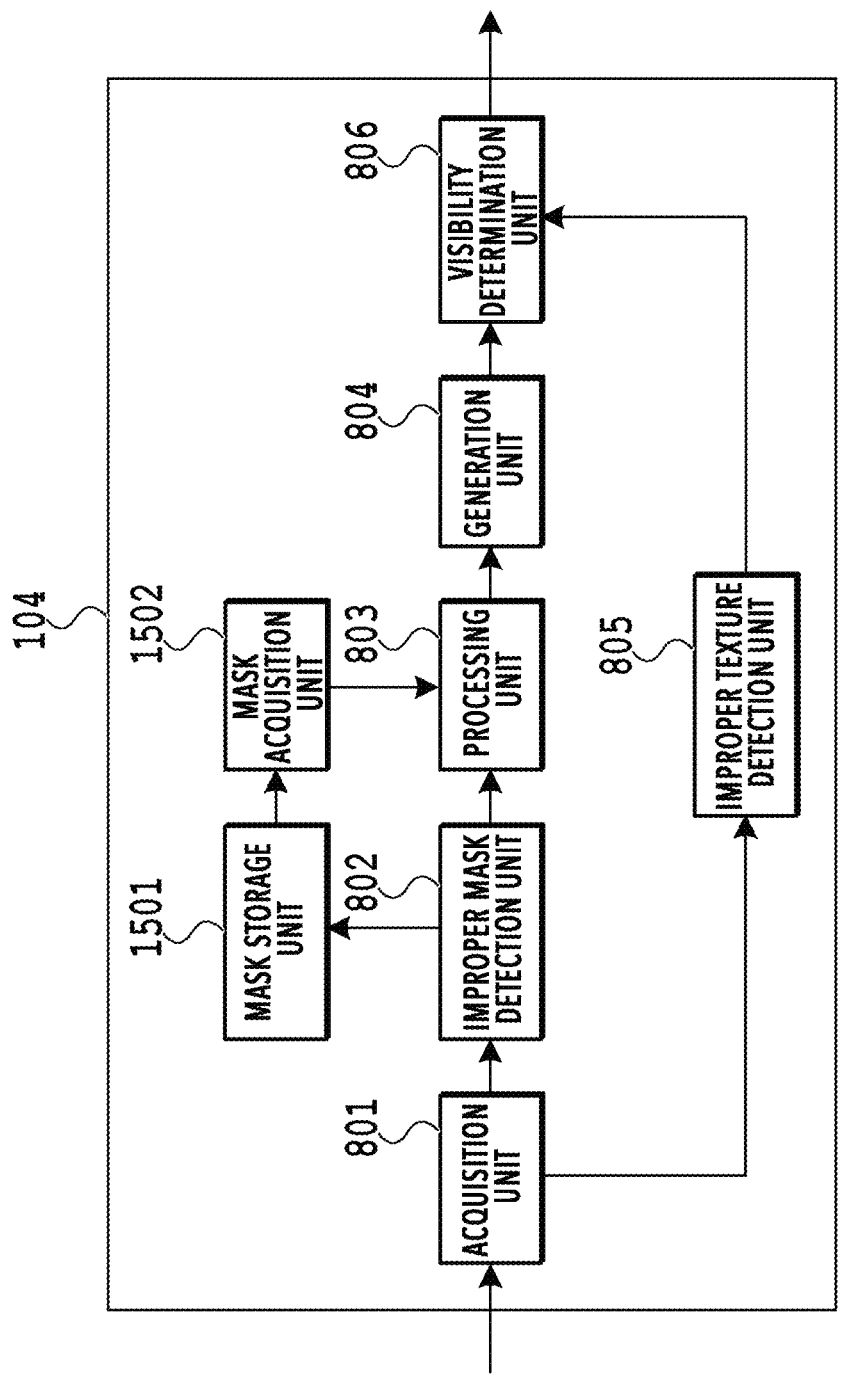
FIG. 15 is a figure illustrating functional blocks of the generation apparatus.

FIG. 15 is a block figure illustrating a configuration of the generation apparatus 104 according to the present embodiment. The same processing blocks as those in the first embodiment are assigned with the same numerals to omit explanations thereof. The generation apparatus 104 according to the present embodiment includes an acquisition unit 801, an improper mask detection unit 802, a processing unit 803, a generation unit 804, an improper texture detection unit 805, a visibility determination unit 806, a mask storage unit 1501, and a mask acquisition unit 1502.

The mask storage unit 1501 stores a foreground mask image of each camera that was generated before (in the past) and was not determined to be improper in association with the corresponding camera. The mask storage unit 1501 is realized by the ROM, the complement storage device, or the like, of the generation apparatus 104. Note that the mask storage unit 1501 may be realized by a ROM, a complement storage device, or the like, of a device other than the generation apparatus 104. In that case, the generation apparatus 104 is connected via a network, or the like, to the device that includes the mask storage unit 1501, in order to acquire a foreground mask image. The mask acquisition unit 1502 acquires a previous foreground mask image from the mask storage unit 1501.

[Flowchart]

Figure 16:
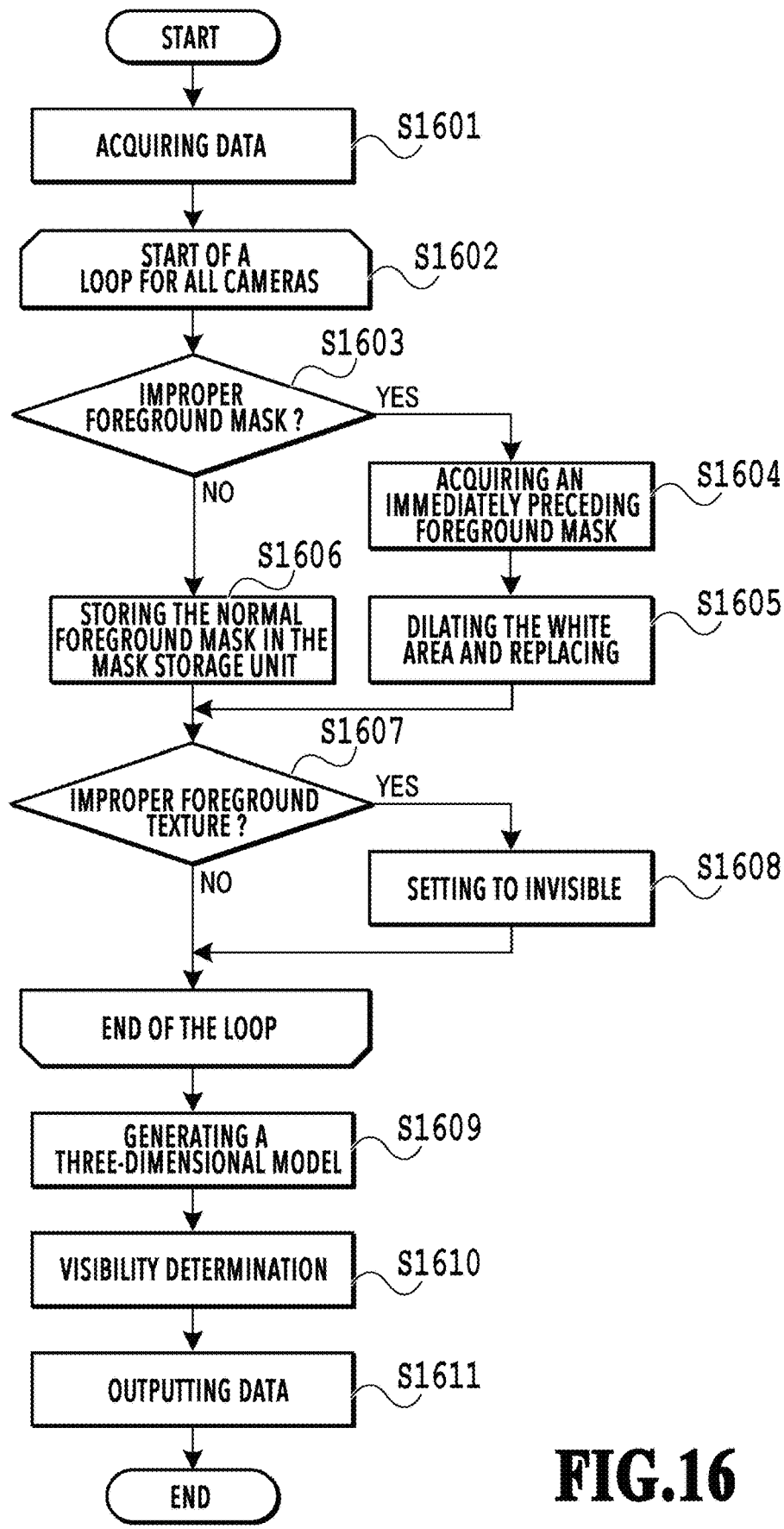
FIG. 16 is a flowchart figure illustrating processing by the generation apparatus.

FIG. 16 is a figure illustrating an example of a flowchart for explaining the processing for generating a three-dimensional model, which is performed by the generation apparatus 104 according to the present embodiment. Since the processes of S1601 through S1603 are identical to the processes of S1001 through S1003, the explanations thereof are omitted.

In a case where a foreground mask image is detected to be improper (S1603: YES), the processing proceeds to S1604. In S1604, the mask acquisition unit 1502 acquires, from the mask storage unit 1501, a foreground mask image that was previously generated from a captured image based on a camera in the same direction as the processing target camera and was not detected to be improper.

Regarding a foreground mask image generated previously, for example, in a case of generating a virtual viewpoint image that is a moving image, the process of each step of the present flowchart is repeatedly performed on a per frame basis. Thus, the foreground mask image generated in the frame immediately preceding the current frame that is in processing is acquired.

In S1605, the processing unit 803 performs the process of making the white area indicating the foreground area of the previous foreground mask image, which is acquired in S1604, into a larger area than the foreground area. In the present embodiment, dilating processing is performed as the process of enlarging the foreground area. Then, the processing unit 803 replaces the foreground mask image of the processing target camera with the processed image and outputs the processed image to the generation unit 804.

Here, for example, the dilating processing is performed for each unit area, which is made by setting each pixel of the foreground mask image as a target pixel and enclosing the target pixel by one pixel. Specifically, the processing is performed such that, in a case where the target pixel is white, all the pixels (8 pixels) in the unit area are turned into the same white as the target pixel. Note that there is no limitation regarding the method of the dilating processing. For example, there may be processing in which, regarding a target pixel, in a case where a white pixel is present in the vicinity of the target pixel, the pixel value of the target pixel is changed to a pixel value for white color.

Figure 17A:
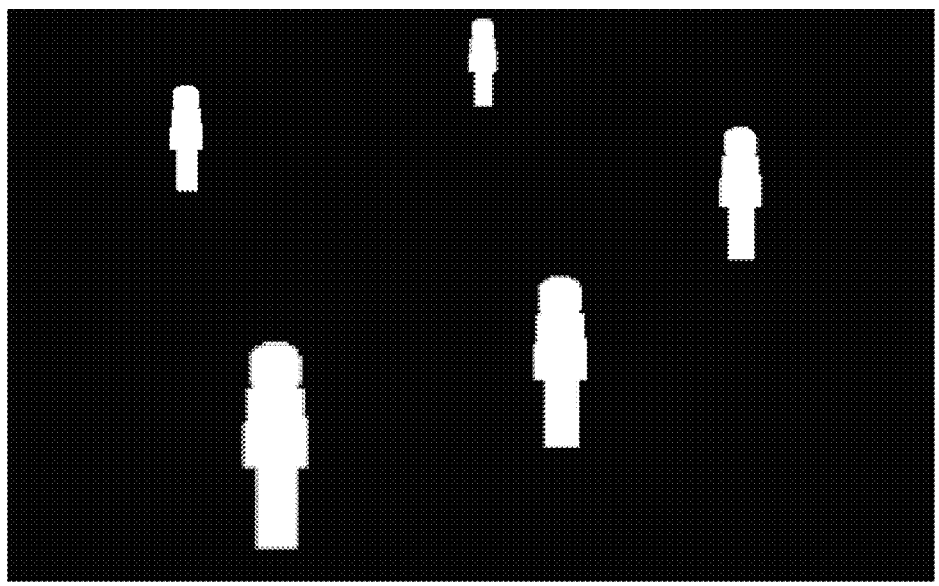
FIGS. 17A and 17B are figures illustrating a process of enlarging foreground areas of a foreground mask image.

FIG. 17A illustrates an example in which the foreground mask image 600 illustrated in FIG. 6 is acquired as the previous foreground mask image and the foreground areas of the foreground mask image 600 are dilated. The number of pixels for dilating the foreground areas are determined based on the time at which the captured image, based on which the foreground mask image acquired in S1601 is generated, is captured and the time at which the captured image, based on which the foreground mask image acquired in S1604 is generated, is captured. In a case of a moving image, the number of pixels may be determined by assuming a range in which a foreground is able to move in the time amount corresponding to the frame of the acquired foreground mask image. For example, there is a case in which images are captured 60 times per second in the stadium 402 and a foreground mask image based on the frame immediately preceding the current frame that is in processing is acquired in S1604. In this case, the range in which a human figure, which is a foreground, is able to move in ⅟60 seconds, which is the time difference between the immediately preceding frame and the current frame, may be calculated in advance, in order to determine the number of pixels to be dilated in the dilating processing.

Figure 17B:
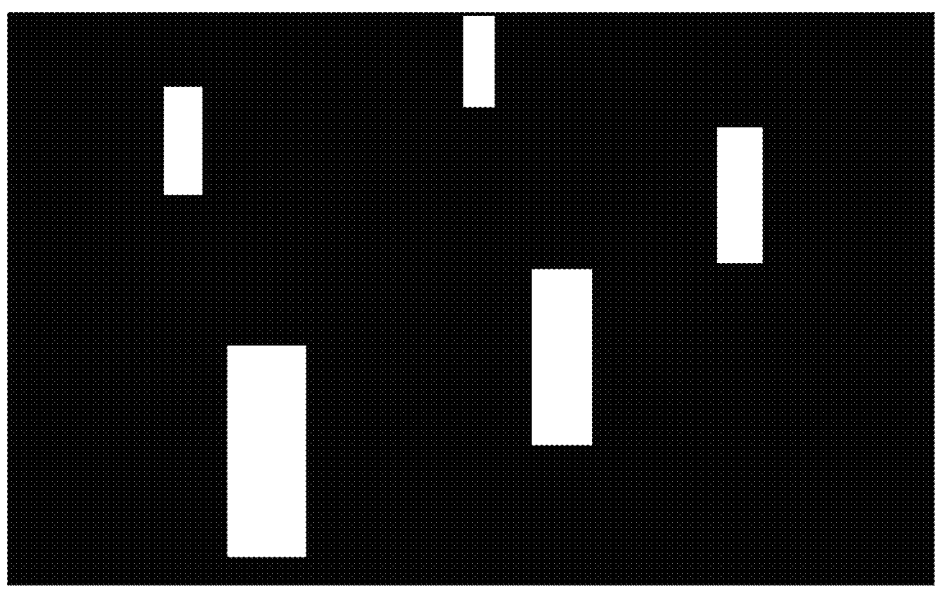

Further, the method for enlarging a foreground area is not limited to the dilating processing. Alternatively, based on the position and size of the immediately preceding foreground mask image, the processing unit 803 may calculate a predetermined area such as a rectangular area including a range in which the foreground can be present. Further, there may be a method in which the processing unit 803 replaces each of the foreground areas with the calculated rectangular areas as illustrated in FIG. 17B and use the image as the foreground mask image of the processing target camera.

In a case where the foreground mask image is not detected to be improper (S1603: NO), the improper mask detection unit 802 stores, in S1606, the normal foreground mask image in the mask storage unit 1501 in association with the processing target camera and time. Since the processes of S1607 through S1611 are identical to the processes of S1005 through S1009, the explanations thereof are omitted.

As explained above, according to the present embodiment, even though a foreground mask image is improper, the improper foreground mask image is replaced with a previous foreground mask image that has been processed. Thereby, it is possible to inhibit the influence of the improper foreground mask image on quality degradation of a three-dimensional model of a foreground. Regarding the image (FIG. 17A or FIG. 17B) with which the improper foreground mask image is replaced in the present embodiment, it is possible to decrease the white area, compared to the replaced image (FIG. 9B or FIG. 14C) in the previously described embodiment. Accordingly, it is possible to reduce the influence of an improper foreground mask image on generation of a three-dimensional model of a foreground, and, therefore, it is possible to realize generation of a virtual viewpoint image with inhibited image quality deterioration.

Note that, although the acquisition unit 801 and the mask acquisition unit 1502 are different modules in the explanation of the present embodiment, there may be a mode in which one acquisition unit acquires data acquired by the respective acquisition units.

Fourth Embodiment

The above-described embodiments are modes in which, for generating a three-dimensional model of a foreground by the volume intersection method, in a case where there is even one foreground mask image whose foreground area does not include the projection of a target voxel, the generation unit 804 deletes the target voxel and generates the three-dimensional model of a foreground.

The present embodiment is a mode in which the number of foreground mask images for deleting a voxel is not one, that is, processing is performed such that a target voxel is deleted in a case where the target voxel is determined to be outside of foregrounds of multiple foreground mask images, depending on cases. As for the present embodiment, differences from the first embodiment are mainly explained. Not-specified parts have the same configuration and processing as those in the first embodiment.

[Functional Configuration of Generation Apparatus]

Figure 18:
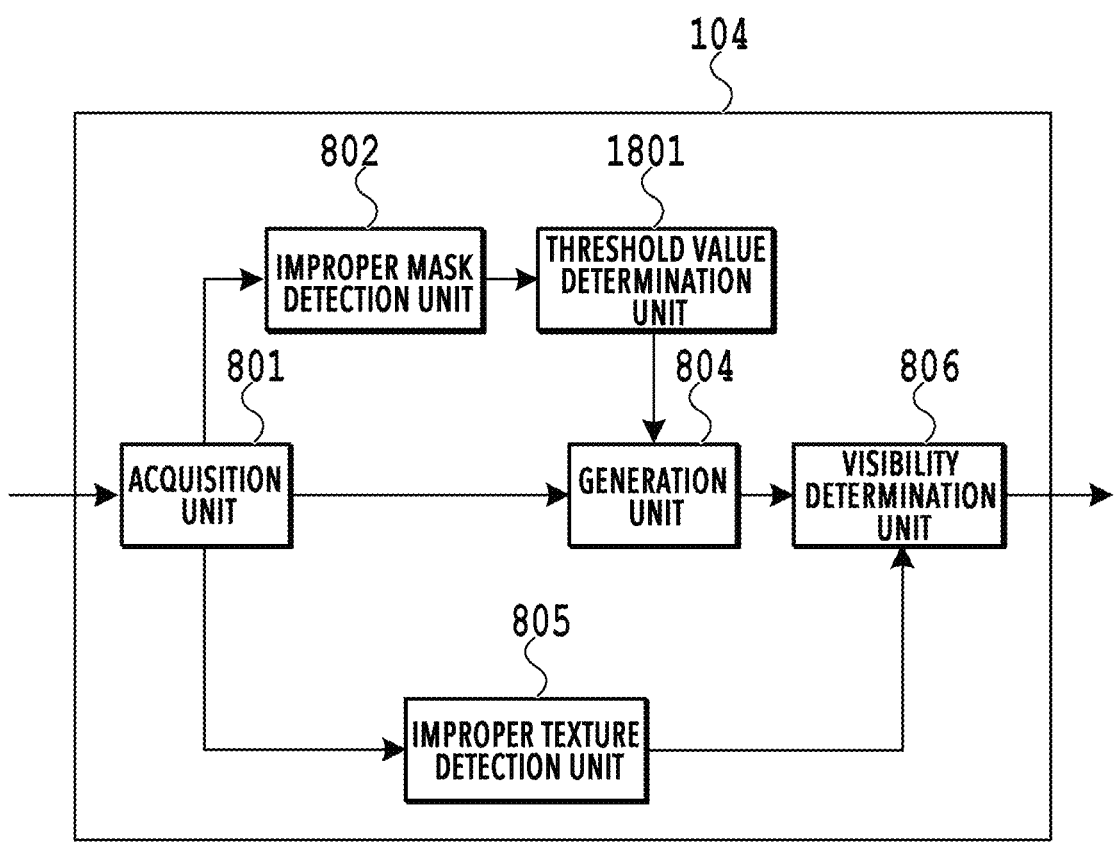
FIG. 18 is a figure illustrating functional blocks of the generation apparatus.

FIG. 18 is a block figure illustrating a configuration of the generation apparatus 104 according to the present embodiment. The same processing blocks as those in the first embodiment are assigned with the same numerals to omit explanations thereof. The generation apparatus 104 according to the present embodiment includes an acquisition unit 801, an improper mask detection unit 802, a generation unit 804, an improper texture detection unit 805, a visibility determination unit 806, and a threshold value determination unit 1801. The threshold value determination unit 1801 determines a threshold value for deleting a target voxel in generation of a three-dimensional model. Details are described below.

[Flowchart]

Figure 19:
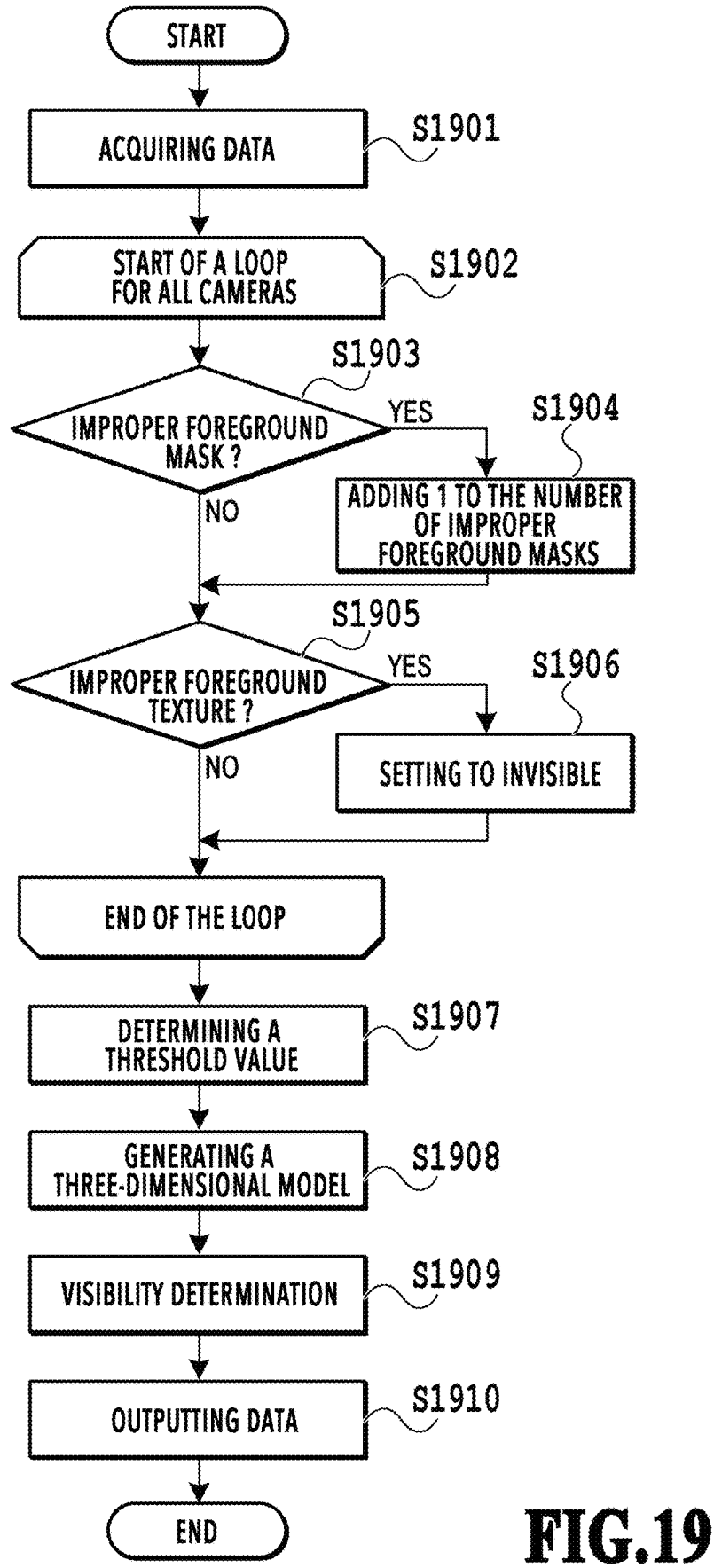
FIG. 19 is a flowchart figure illustrating processing by the generation apparatus.

FIG. 19 is a figure illustrating an example of a flowchart for explaining the processing for generating a three-dimensional model, which is performed by the generation apparatus 104 according to the present embodiment. Since the processes of S1901 through S1903 are identical to the processes of S1001 through S1003 the explanations thereof are omitted.

In a case where the foreground mask image of the processing target camera is detected to be improper (S1903:

YES), the improper mask detection unit 802 adds 1 to the number of improper foreground mask images in S1904. The number of improper foreground mask images is the number of foreground mask images detected to be improper from among the foreground mask images corresponding to the respective cameras 101a through 101r. Since the processes of S1905 and S1906 are identical to the processes of S1005 and S1006, the explanations thereof are omitted.

In S1907, the threshold value determination unit 1801 determines a threshold value based on the number of improper foreground mask images. In the present embodiment, the threshold value determination unit 1801 determines the number of improper foreground mask images as the threshold value. Note that the method for determining the threshold value, which is performed by the threshold value determination unit 1801, is not limited thereto. For example, the threshold value may be determined such that the threshold value decreases as the number of improper foreground mask images becomes closer to the number of cameras that synchronously capture the foreground.

In S1908, the generation unit 804 generates a three-dimensional model based on the foreground mask images from the images captured synchronously. As described above, the generation unit 804 determines whether or not the projection of one target voxel, which is the processing target voxel in the collection of voxels in the subject space, is inside of the foreground areas of each foreground mask image, so as to generate a three-dimensional model. In the present embodiment, by this determination, the target voxel is deleted from the collection of voxels only in a case where the number of foreground mask images whose foreground area does not include the projection of the target voxel is greater than the threshold value. That is, in a case where the number of such foreground mask images is equal to or smaller than the threshold value, the target voxel is not contributed to generation of a three-dimensional model.

Figure 20:
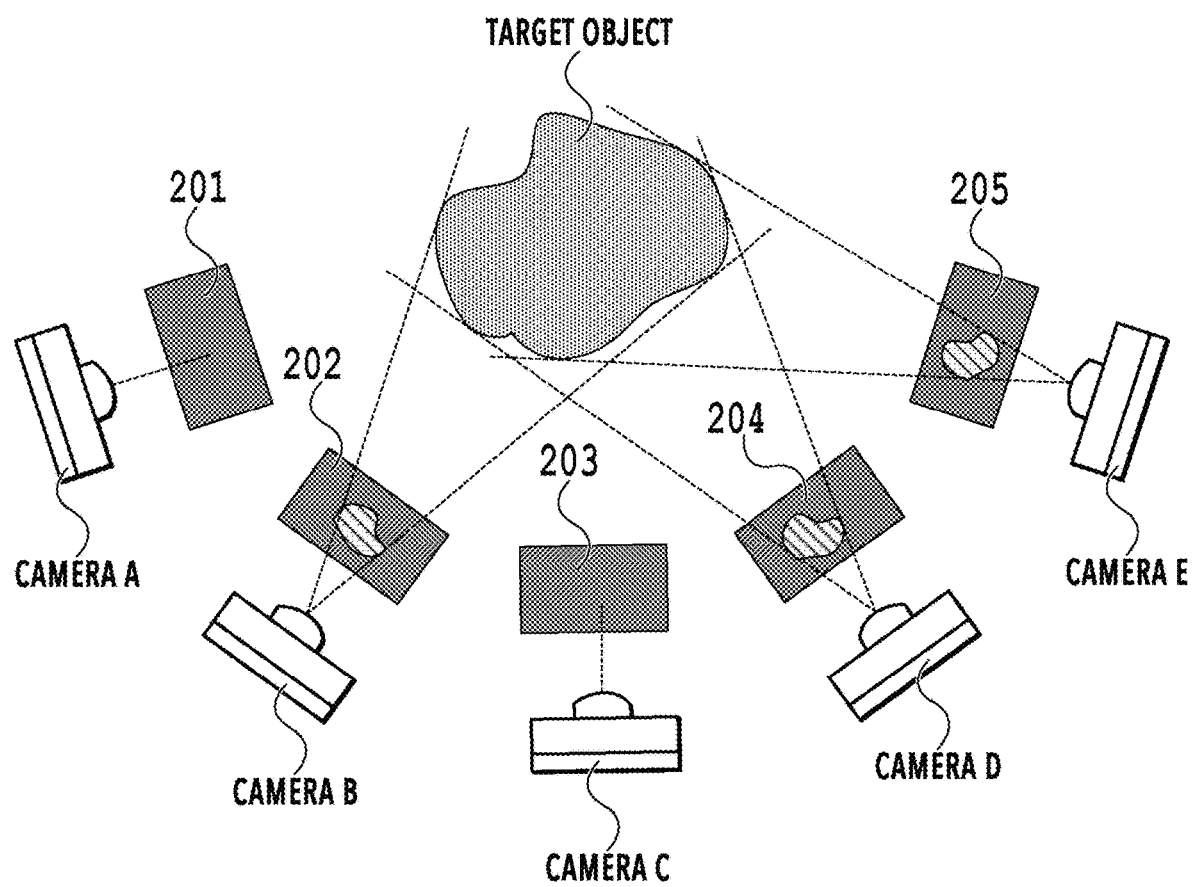
FIG. 20 is a figure illustrating a generation method of a three-dimensional model of a foreground by use of a threshold value.

FIG. 20 is a figure for explaining generation of a three-dimensional model of a foreground by using the five cameras A through E that capture images of an object to be the foreground, based on the present embodiment. It is indicated that the foreground mask images 201 and 203, which are based on the images captured by the camera A and the camera C, are improper foreground mask images, and the foreground mask images 202, 204, and 205 of the camera B, the camera D, and the camera E are normal foreground mask images. Thus, in the state of FIG. 20, since the number of improper foreground mask images is 2, the threshold value determined based on the number of improper foreground mask images is also determined to be 2.

In the case where the threshold value is 2, a target voxel, which is the processing target voxel, is deleted from the collection of voxels if the target voxel is not projected on foreground areas of foreground mask images from three cameras whose number is greater than 2 which is the threshold value. That is, even in a case where the target voxel is not projected on foreground areas of the two cameras, if the target voxel is projected on the foreground areas of the foreground mask images of the other three cameras, a three-dimensional model is generated without deleting the target voxel.

In FIG. 20, the target voxel is not projected on foreground areas of the improper foreground mask images 201 and 203 from the two cameras A and C, whose number is in the threshold value. However, the target voxel is not deleted in that condition, and in a case where the target voxel is not projected on at least one of the other three normal foreground mask images 202, 204, and 205 as well, the target voxel is deleted. By determination regarding a target voxel by use of a threshold value in such a manner, a three-dimensional model is generated. Since the processes of S1909 and S1910 are identical to the processes of S1008 and S1009, the explanations thereof are omitted.

As explained above, according to the present embodiment, by determining a threshold value for generating a three-dimensional model of a foreground, it is possible to inhibit voxels that should be included in a three-dimensional model from being deleted due to a small number of improper foreground mask images. Therefore, it is possible to inhibit the quality of a three-dimensional model of a foreground from being deteriorated, and it is possible to realize generation of a virtual viewpoint image with inhibited image quality deterioration.

Although voxels are used as elements configuring the three-dimensional space in the explanation of the present embodiment, the present embodiment can also be realized by using points as elements configuring the three-dimensional space, as described above.

Fifth Embodiment

In the present embodiment, in a case where there is an improper foreground mask image among acquired foreground mask images, an immediately preceding three-dimensional model of a foreground is moved based on a moving amount of the foreground, so as to generate a new three-dimensional model of the foreground Therefore, even in a case where an improper foreground mask image is acquired, it is possible to generate a three-dimensional model of a foreground with decreased quality degradation. As for the present embodiment, differences from the first embodiment are mainly explained. Not-specified parts have the same configuration and processing as those in the first embodiment.

[Functional Configuration of Generation Apparatus]

Figure 21:
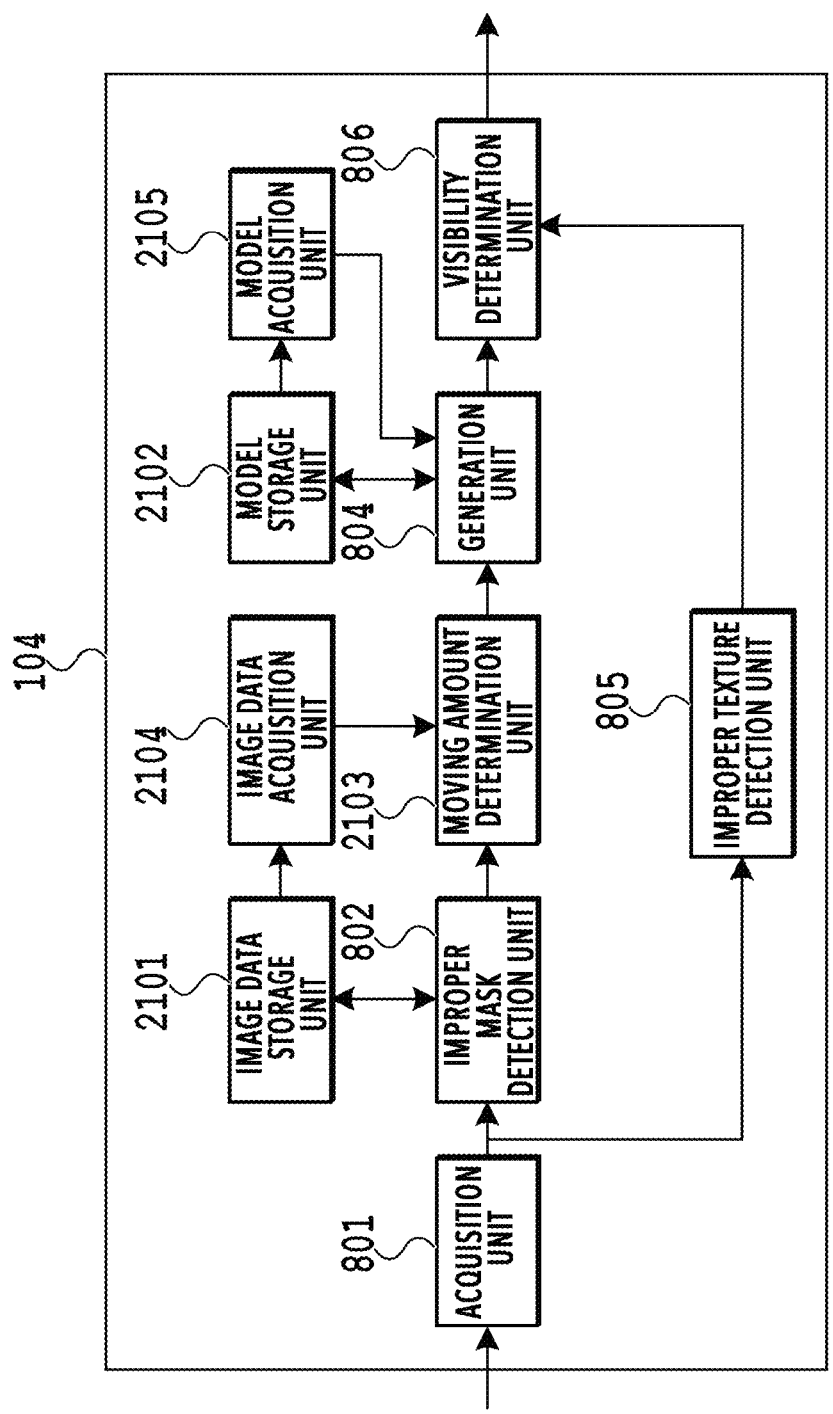
FIG. 21 is a figure illustrating functional blocks of the generation apparatus.

FIG. 21 is a block figure illustrating a configuration of the generation apparatus 104 according to the present embodiment. The same processing blocks as those in the first embodiment are assigned with the same numerals to omit explanations thereof. The generation apparatus 104 includes an acquisition unit 801, an improper mask detection unit 802, a generation unit 804, an improper texture detection unit 805, and a visibility determination unit 806. Further, the generation apparatus 104 according to the present embodiment includes an image data storage unit 2101, a model storage unit 2102, a moving amount determination unit 2103, an image data acquisition unit 2104, and a model acquisition unit 2105.

The image data storage unit 2101 stores data such as previous image data acquired by the acquisition unit 801. The model storage unit 2102 stores a previously generated three-dimensional model of a foreground. The image data storage unit 2101 and the model storage unit 2102 are realized by a ROM, a complement storage device, or the like. Note that the image data storage unit 2101 and the model storage unit 2102 may be realized by a ROM, a complement storage device, or the like, that is in a device other than the generation apparatus 104.

The moving amount determination unit 2103 determines the moving amount of a foreground in a given time period. The image data acquisition unit 2104 acquires previous image data from the image data storage unit 2101. The model acquisition unit 2105 acquires data of a previously generated three-dimensional model of a foreground from the model storage unit 2102.

[Flowchart]

Figure 22:
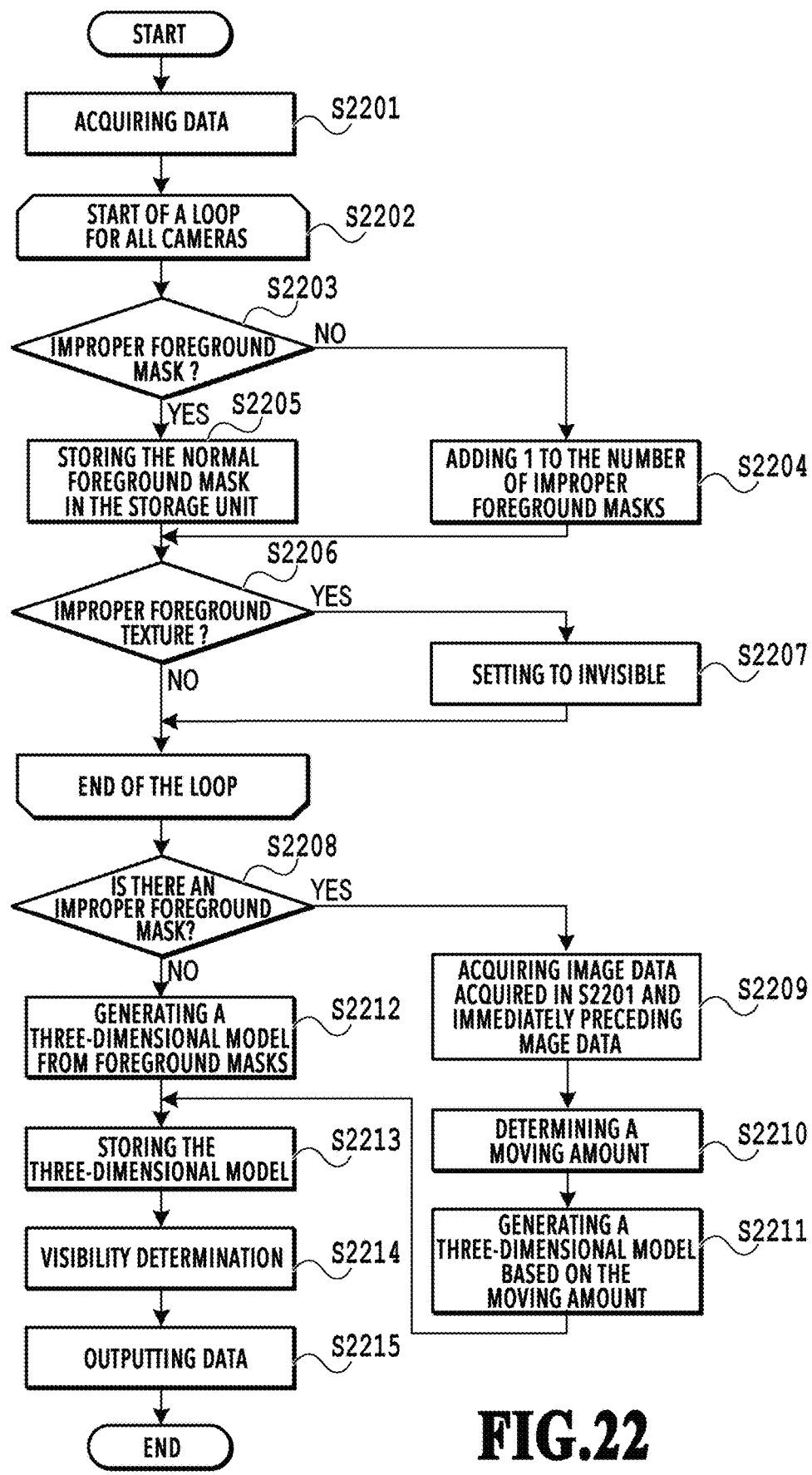
FIG. 22 is a flowchart figure illustrating processing by the generation apparatus.

FIG. 22 is a figure illustrating an example of a flowchart for explaining the processing for generating a three-dimensional model of a foreground, which is performed by the generation apparatus 104 according to the present embodiment. In the present embodiment, as with the second embodiment, each of the foreground extraction apparatuses 102a to 102r in the foreground extraction apparatus group 102 generates a foreground rectangular mask image in addition to a foreground mask image and a foreground texture image.

In S2201, the acquisition unit 801 acquires a foreground mask image, a foreground texture image, a foreground rectangular mask image, and the coordinates of the foreground rectangular mask image on the foreground mask image corresponding to each of the cameras 101a through 101r from the foreground extraction apparatuses 102a through 102r. Since the processes of S2202 and S2203 are identical to the processes of S1002 and S1003, the explanations thereof are omitted.

In a case where a foreground mask image is detected to be improper (S2203: YES), the improper mask detection unit 802 adds 1 to the number of improper foreground mask images in S2204. The number of improper foreground mask images is the number of foreground mask images detected to be improper from among the foreground mask images corresponding to the respective cameras 101a through 101r.

In a case where a foreground mask image is not detected to be improper (S2203: NO), the improper mask detection unit 802 stores, in S2205, the normal foreground mask image in the image data storage unit 2101 in association with the foreground rectangular mask image, the processing target camera, and time. Since the processes of S2206 and S2207 are identical to the processes of S1005 and S1006, the explanations thereof are omitted.

In S2208, the improper mask detection unit 802 determines whether there is any improper foreground mask image as a result of the detection for improper foreground mask images in S2203. In the present embodiment, in a case where the number of improper foreground mask images is 1 or more, it is determined that there is an improper foreground mask image. In a case where there is a foreground mask image determined to be improper (S2208: YES), the processing proceeds to S2209.

Subsequently, in S2209 through S2211, a three-dimensional model of a foreground is not generated based on the foreground mask images acquired in S2201. In the present embodiment, in a case where an improper foreground mask image is detected, a three-dimensional model of a foreground is estimated based on a moving amount and a previously generated three-dimensional model of the foreground, so as to generate a three-dimensional model of the foreground.

In S2209, the image data acquisition unit 2104 selects a first foreground mask image from foreground mask images that have not been detected to be improper from the data acquired by the acquisition unit 801 in S2201. The image data acquisition unit 2104 acquires a foreground rectangular mask image indicating a foreground area of the first foreground mask image and data of the coordinates thereof.

Further, the image data acquisition unit 2104 selects, from the image data storage unit 2101, a second foreground mask image, which is a foreground mask image generated based on a captured image previously captured from the same direction as the first foreground mask image and has not been detected to be improper. Then, the image data acquisition unit 2104 acquires, from the image data storage unit 2101, a foreground rectangular mask image indicating a foreground area of the second foreground mask image and data of the coordinates thereof.

In a case of generating a virtual viewpoint image of a moving image, the process of each step of the present flowchart is repeatedly performed on a per frame basis. Therefore, for example, the image data acquisition unit 2104 may select, as the second foreground mask image, a foreground mask image acquired in the frame immediately preceding the current frame that is in processing and acquire a foreground rectangular mask image. In addition, among foreground mask images of the current frame that have not been detected to be improper, a foreground mask image whose immediately preceding frame has not been detected to be improper as well may be selected as the first foreground mask image.

In S2210, the moving amount determination unit 2103 calculates the moving amount (including the moving direction) of the foreground between the time at which the second foreground mask image, which is acquired by the image data acquisition unit 2104, is captured and the time at which the first foreground mask image is captured, which is the processing target time in the present flowchart. The moving amount determination unit 2103 determines the moving amount of the foreground based on the calculated moving amount.

As the calculation method for determining a moving amount of a foreground in the present embodiment, a moving amount is calculated based on the difference between the center coordinates of a foreground rectangular mask image included in the first foreground mask image and the center coordinates of a foreground rectangular mask image included in the second foreground mask image.

Figure 23A:
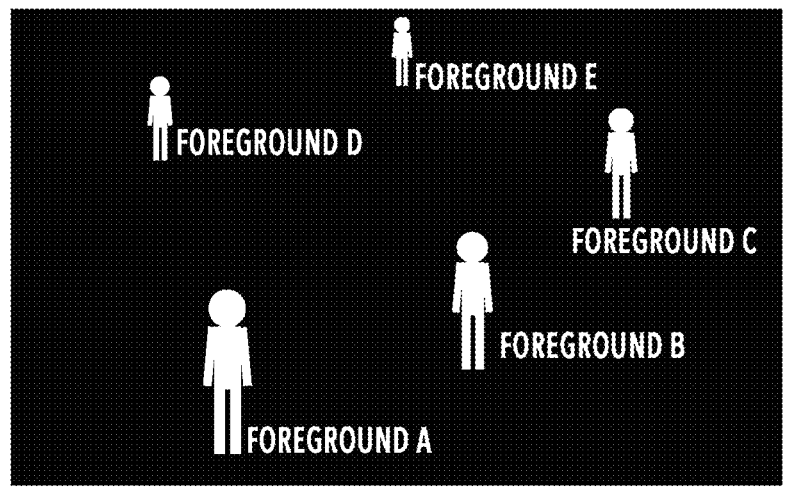
FIGS. 23A through 23C are figures illustrating the moving amounts of foregrounds on a captured image.
Figure 23B:
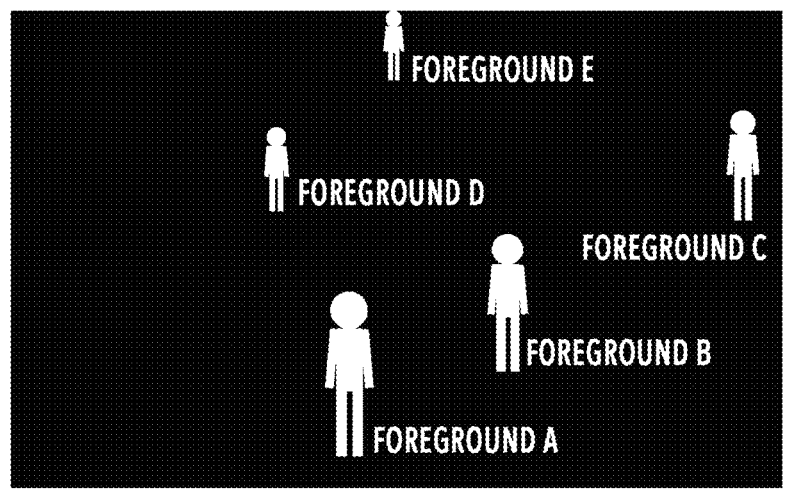
Figure 23C:
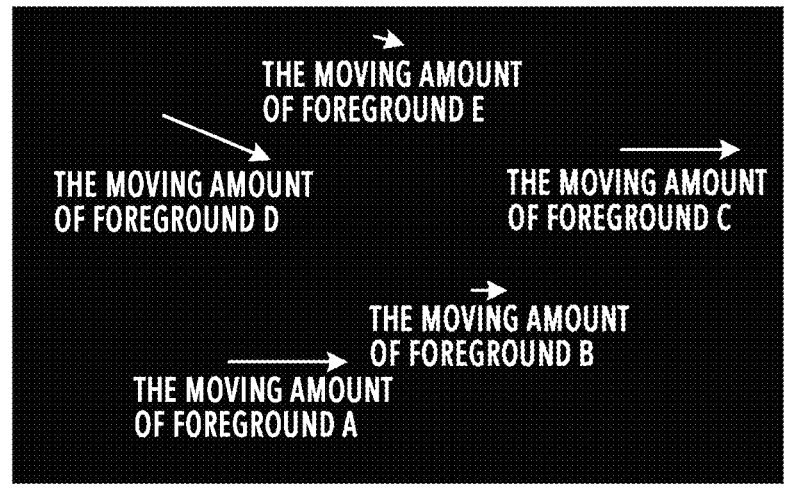

FIGS. 23A through 23C are examples of calculating the moving amount of each foreground, based on the difference between the center coordinates of foreground rectangular mask images. FIG. 23A is a figure illustrating an example of the first foreground mask image, and FIG. 23B is a figure illustrating an example of the second foreground mask image. Further, FIG. 23C is a figure illustrating that the moving amount is determined for each foreground of the second foreground mask image and the first foreground mask image. The arrows in FIG. 23C represent the determined moving directions and moving amounts.

The calculation method for the moving amount determination unit 2103 to determine a moving amount may also be a method of calculating a moving amount based on the average difference value of foreground areas without using foreground rectangular mask images. Further, a method of calculating a moving amount without using a foreground mask image or a foreground rectangular mask image may be used. For example, there may be a method in which, by use of such an image in which an area including a foreground in a captured image is calculated as a rectangular area as illustrated in FIG. 7A and the same kind of image calculated from an image captured previously, a moving amount is calculated from a difference between the center coordinates of the rectangular images. Alternatively, a method of calculating a moving amount of each foreground by multiple cameras may be used. Furthermore, it is also possible that the moving amount determination unit 2103 acquires a moving amount from another device, or the like, and determine a moving amount of a foreground using the moving amount.

Further, based on the determined moving amount of the foreground, the moving amount determination unit 2103 calculates and determines the moving amount in the three-dimensional space by use of the camera parameters of the camera that captured the first foreground mask image.

In S2211, the model acquisition unit 2105 acquires a three-dimensional model of a foreground generated based on foreground mask images including the second foreground mask image, which is stored in the model storage unit 2102. Then, based on the moving amount in the three-dimensional space, the generation unit 804 moves the three-dimensional model of a foreground based on the acquired second foreground mask image, so as to generate a three-dimensional model of a foreground at the processing target time, that is, the time at which the images acquired in S2201 are captured synchronously.

On the other hand, in a case where there is no improper foreground mask image (S2208: NO), the generation unit 804 generates, in S2212, a three-dimensional model of a foreground, based on the foreground mask image acquired in S2201. Since the generation method is identical to in S1007 the explanation thereof is omitted. In S2213, the generation unit 804 stores the generated three-dimensional model of a foreground in the model storage unit 2102.

In S2214, the visibility determination unit 806 performs visibility determination. Here, in the case where a three-dimensional model of a foreground is generated based on a moving amount in S2211, the camera position is also moved as much as the moving amount by the camera parameters, and the visibility determination is performed. Since the process of S2215 is identical to the process of S1009, the explanation thereof is omitted.

As explained above, in the present embodiment, the shape of a three-dimensional model to be generated is estimated from a previously generated three-dimensional model of a foreground by determining the moving amount of the foreground, so as to generate a three-dimensional model of a foreground. Accordingly, it is possible to inhibit the quality of a three-dimensional model of a foreground from being deteriorated due to an improper foreground mask image, and, therefore, it is possible to realize generation of a virtual viewpoint image with inhibited image quality deterioration.

Note that, although the acquisition unit 801, the image data acquisition unit 2104, and the model acquisition unit 2105 are explained as different modules in the present embodiment, there may be a mode in which one acquisition unit acquires data acquired by the respective acquisition units.

Other Embodiments

The above-described embodiments are explained as modes in which the foreground extraction apparatus corresponding to each camera extracts a foreground area of the captured image of each camera. In addition, there may be a mode in which one image processing apparatus also including the function of a foreground extraction apparatus acquires image data of multiple cameras and the image processing apparatus generates a foreground mask image and a foreground texture image of each camera.

In the above-described embodiments, the improper mask detection unit 802 and the improper texture detection unit 805 are explained as different modules. However, there may be a mode in which one detection unit detects whether each of a foreground mask image, a foreground rectangular mask image, and a foreground texture image is improper.

In the above-described embodiments, the control apparatus 103, the generation apparatus 104, and the rendering apparatus 105 are explained as different apparatuses. Alternatively, the functions of the control apparatus 103, the generation apparatus 104, and the rendering apparatus 105 may be realized by one or two apparatuses. For example, there may be a mode in which generation of a three-dimensional model of a foreground and generation of a virtual viewpoint image are performed by one image processing apparatus.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-226607, filed Dec. 3, 2018, which is hereby incorporated by reference wherein in its entirety.

What is claimed is:

1. An image processing apparatus comprising:
one or more memories storing instructions; and
one of more processors that implement the instructions to:
acquire a plurality of images obtained based on image capturing by a plurality of image capturing devices including a first image capturing device and a second image capturing device;
generate three-dimensional shape data of an object based on the acquired plurality of images;
acquire a plurality of images that represent a texture of the object;
detect an abnormal image included in the acquired plurality of images that represent a texture of the object; and
generate a virtual viewpoint image based on the generated three-dimensional shape data without using an image that represents a texture of the object or is detected to be abnormal,
wherein, in a case where a first acquired image from the first image capturing device is inappropriate for generating the three-dimensional shape data of the object and a second acquired image from the second image capturing device is appropriate for generating the three-dimension shape data of the object, the three-dimensional shape data of the object is generated based on the first acquired image to which specific processing is performed and the second acquired image to which the specific processing is not performed.

2. The image processing apparatus according to claim 1, wherein the specific processing comprises replacing the first acquired image with a replacement image where an entire area thereof is an object area.

3. The image processing apparatus according to claim 1, wherein:
the one or more processors further implement the instructions to detect a normal area in the first acquired image, and
the specific processing comprises replacing the first acquired image with a replacement image where part of an area other than the detected normal area in the first acquired image is an object area.

4. The image processing apparatus according to claim 3, wherein the part of the area other than the detected normal area in the first acquired image is an area other than a predetermined area where the detected normal area is included.

5. The image processing apparatus according to claim 1, wherein:
the one or more processors further implement the instructions to acquire a previous image representing an object area and corresponding to the first acquired image, and
the specific processing comprises replacing the first acquired image with a replacement image obtained by enlarging the object area included in the acquired previous image.

6. The image processing apparatus according to claim 5, wherein the acquired previous image representing an object area based on a captured image previously captured from the same direction as the image capturing of the first acquired image by the first image capturing device.

7. The image processing apparatus according to claim 5, wherein the replacement image is obtained by dilating processing.

8. The image processing apparatus according to claim 5, wherein an entirety of a predetermined area of the replacement image is the object area.

9. The image processing apparatus according to claim 5, wherein the one or more processors further implement the instructions to determine an enlarging size of the object area, based on a region where the object is able to move in a time difference between a time at which the first acquired image is captured and a time at which the acquired previous image is captured.

10. An image processing apparatus comprising:
one or more memories storing instructions; and
one of more processors that implement the instructions to:
acquire a plurality of images obtained based on image capturing by a plurality of image capturing devices, at least one image representing an object area of an object;
detect an abnormal image included in the acquired plurality of images, the abnormal image being inappropriate for generating three-dimensional shape data of the object;
determine, based on the number of detected abnormal images, a threshold value for generating the three-dimensional shape data of the object;
generate the three-dimensional shape data of the object based on the acquired plurality of images and the determined threshold value, wherein:
in a case where the number of images, whose object areas do not include an area corresponding to an element forming a three-dimensional space, is greater than the determined threshold value, the three-dimensional shape data of the object is generated by deleting the element, and
in a case where the number of images, whose object areas do not include the area corresponding to the element, is not greater than the determined threshold value, the three-dimensional shape data of the object is generated without deleting the element.

11. The image processing apparatus according to claim 10, wherein the area corresponding to the element is determined based on a result of a projection of the element.

12. The image processing apparatus according to claim 10, wherein the number of detected abnormal images is determined as the determined threshold value.

13. The image processing apparatus according to claim 1, wherein the one or more processors further implement the instructions to determine, based on at least one of a data header, a data size, or a checksum of image data, whether each of the acquired plurality of images is inappropriate for generating the three-dimensional shape data of the object.

14. The image processing apparatus according to claim 10, wherein:
the one or more processors further implement the instructions to perform specific processing on the detected abnormal image, and
the three-dimensional shape data of the object is generated based on an image obtained as a result of performing the specific processing on the detected abnormal image, instead of the detected abnormal image.

15. The image processing apparatus according to claim 14, wherein:
in a case where a first acquired image, among the acquired plurality of images, does not represent the object area, the first acquired image is detected as the abnormal image, and
the specific processing comprises using an image, which is not one of the acquired plurality of images, where an entirety of the object area represent the object.

16. The image processing apparatus according to claim 15, wherein the specific processing comprises replacing the detected abnormal image with an image representing an entire area thereof as an object area.

17. The image processing apparatus according to claim 15, wherein:
the one or more processors further implement the instructions to detect a normal area in the detected abnormal image, and
the specific processing comprises replacing the detected abnormal image with a replacement image where part of an area other than the detected normal area in the detected abnormal image is an object area.

18. The image processing apparatus according to claim 15, wherein:
the one or more processors further implement the instructions to acquire a previous image representing an object area and corresponding to the detected abnormal image, and
the specific processing comprises replacing the detected abnormal image with a replacement image obtained by enlarging an object area included in the acquired previous image.

* * * * *